United States Patent
Kim et al.

(10) Patent No.: US 10,067,319 B2
(45) Date of Patent: Sep. 4, 2018

(54) SINGLE FOCUS LENS AND PHOTOGRAPHING APPARATUS HAVING THE SAME

(71) Applicant: SAMSUNG ELECTRONICS CO., LTD., Suwon-si, Gyeonggi-do (KR)

(72) Inventors: Dong-woo Kim, Hwaseong-si (KR); Shuji Yoneyama, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/371,509

(22) Filed: Dec. 7, 2016

(65) Prior Publication Data

US 2017/0176721 A1 Jun. 22, 2017

(30) Foreign Application Priority Data

Dec. 18, 2015 (KR) .......... 10-2015-0181852

(51) Int. Cl.
| | | |
|---|---|---|
| *G02B 3/02* | (2006.01) | |
| *G02B 15/14* | (2006.01) | |
| *G02B 13/02* | (2006.01) | |
| *G02B 9/14* | (2006.01) | |
| *G02B 13/00* | (2006.01) | |
| *G02B 9/18* | (2006.01) | |
| *G02B 5/00* | (2006.01) | |
| *G02B 27/64* | (2006.01) | |
| *G02B 27/00* | (2006.01) | |

(52) U.S. Cl.
CPC .......... *G02B 13/0045* (2013.01); *G02B 5/005* (2013.01); *G02B 9/18* (2013.01); *G02B 13/006* (2013.01); *G02B 27/0025* (2013.01); *G02B 27/646* (2013.01)

(58) Field of Classification Search
CPC ........ G02B 13/02; G02B 15/08; G02B 13/18; G02B 15/177; G02B 15/173; G02B 25/001; G02B 21/02; G02B 15/10; G02B 23/243; G02B 13/24; G02B 13/0025; G02B 9/12
USPC ....... 359/716, 748, 675, 689, 690, 645, 661, 359/672, 735, 784–788
See application file for complete search history.

(56) References Cited

U.S. PATENT DOCUMENTS

| | | |
|---|---|---|
| 8,810,931 B2 | 8/2014 | Sunaga et al. |
| 9,291,878 B2 | 3/2016 | Miyazaki |
| 2015/0092100 A1 | 4/2015 | Chen et al. |

FOREIGN PATENT DOCUMENTS

| | | |
|---|---|---|
| JP | 2013-037080 | 2/2013 |
| JP | 2015-068910 | 4/2015 |
| JP | 2015-096915 | 5/2015 |
| JP | 2015-146015 | 8/2015 |

*Primary Examiner* — Dawayne A Pinkney
(74) *Attorney, Agent, or Firm* — Nixon & Vanderhye, P.C.

(57) ABSTRACT

A single focus lens and a photographing apparatus including the single focus lens are provided. The photographing apparatus includes a single focus lens comprising: a first lens group having a positive refractive power, the first lens group including a first negative lens and a second negative lens arranged in succession at a most object side of the first lens group; a second lens group having a negative refractive power; and a third lens group having a positive refractive power and including a positive lens and a negative lens. The first to third lens groups are sequentially arranged in a direction from an object side to an image side.

17 Claims, 17 Drawing Sheets

SINGLE FOCUS LENS AND PHOTOGRAPHING APPARATUS HAVING THE SAME

CROSS-REFERENCE TO RELATED APPLICATION

This application is based on and claims priority under U.S.C. § 119 to Korean Patent Application No. 10-2015-0181852, filed on Dec. 18, 2015, in the Korean Intellectual Property Office, the disclosure of which is incorporated by reference herein in its entirety.

BACKGROUND

1. Field

The present disclosure relates generally to fast, wide-angle, single focus lenses and photographing apparatuses including the fast, wide-angle, single focus lenses.

2. Description of Related Art

More services and additional functions are provided by electronic devices. Electronic devices such as mobile devices or user devices may provide various services using various sensor modules. Electronic devices may provide multimedia services such as photographic services or video services. Along the increasing use of electronic devices, the use of cameras operatively connected to electronic devices has also gradually increased. This increasing use has induced improvements in the performance and/or resolution of cameras of electronic devices. Photographs of various landscapes or people, or selfies may be taken using cameras of electronic devices. In addition, such multimedia as photographs or videos may be shared through social network sites or other media.

The advance in semiconductor and display technology has enabled the development of various single focus lenses for cameras of mobile devices, for example, single focus lenses with low resolutions to high resolutions, with small-sensor formats to large-sensor formats (e.g., from ⅛" to ½" sensors), or with lens assemblies having a small number of lenses to lens assemblies having a large number of lenses.

Photographing apparatuses with solid-state imaging devices such as charge-coupled device (CCD) image sensors or complementary metal-oxide semiconductor (CMOS) image sensors have been widely used. Photographing apparatuses employing solid-state imaging devices, such as digital cameras, interchangeable lens systems, or video cameras, are required to have high-resolution and high-quality characteristics. Since photographing apparatuses employing solid-state imaging devices are easily manufactured in small sizes, recent small information terminals such as cellular phones employ such photographing apparatuses.

However, it is difficult to impart high-resolution and high-quality characteristics to small photographing apparatuses or lens systems.

SUMMARY

The present disclosure provides fast, wide-angle, single focus lenses.

The present disclosure further provides photographing apparatuses including fast, wide-angle, single focus lenses.

Additional aspects will be set forth in part in the description which follows and, in part, will be apparent from the description.

According to an aspect of an example embodiment, a single focus lens includes: a first lens group having a positive refractive power, the first lens group comprising a first negative lens and a second negative lens arranged in succession at a most object side of the first lens group; a second lens group having a negative refractive power and comprising a focusing lens configured to perform a focusing operation; and a third lens group having a positive refractive power and comprising a positive lens and a negative lens, wherein the first lens group, the second lens group, and the third lens group are sequentially arranged in a direction from an object side to an image side.

The single focus lens may satisfy the following expression:

$$0.4 \leq f1/f \leq 1.3$$

where f1 denotes a focal length of the first lens group, and f denotes a total focal length of the single focus lens.

The first lens group may further include an aperture stop.

A lens closest to an object side of the aperture stop may perform a handshaking compensation operation.

The lens for handshaking compensation may include a biconcave lens.

A doublet lens in which a negative lens concave toward the object side and a biconvex lens are cemented together may be provided at an image side of the aperture stop.

The single focus lens may include at least one aspherical lens at an object side of the aperture stop and at least one aspherical lens at an image side of the aperture stop.

The single focus lens may satisfy the following expression:

$$1.85 \leq N2 \leq 2.1$$

where N2 denotes a refractive index of the focusing lens of the second lens group at a d-line wavelength.

The focusing lens of the second lens group may include a meniscus lens convex toward the object side.

The single focus lens may satisfy the following expression:

$$-2.0 \leq f2/f \leq -0.7$$

where f2 denotes a focal length of the focusing lens of the second lens group, and f denotes a total focal length of the single focus lens.

The single focus lens may satisfy the following expression:

$$-100 \leq f1a \leq -10$$

where f1a denotes effective combined focal length of the first negative lens and the second negative lens of the first lens group.

The first lens group may further include a third positive lens and a fourth positive lens at an image side of the second negative lens.

The single focus lens may satisfy the following expression:

$$-2 \leq f1a/f1b \leq -0.5$$

where f1a denotes a combined focal length of the first and second negative lenses of the first lens group, and f1b denotes a combined focal length of the third and fourth positive lenses of the first lens group.

The third lens group may include a fifth positive lens and a sixth negative lens.

The single focus lens may satisfy the following expression:

$$-20 \leq f3b/f3a \leq -1$$

where f3a denotes a focal length of the fifth positive lens of the third lens group, and f3b denotes a focal length of the sixth negative lens of the third lens group.

The single focus lens may have a field of view within a range of about 55° to about 180°.

The single focus lens may have an F-number of about 1.8 or less.

The first negative lens may have a meniscus shape convex toward the object side.

The second negative lens may have a meniscus shape convex toward the object side or a biconcave shape.

According to an aspect of another example embodiment, a photographing apparatus includes a single focus lens and an image sensor configured to receive an image formed by the single focus lens, wherein the single focus lens comprises: a first lens group having a positive refractive power, the first lens group comprising a first negative lens and a second negative lens arranged in succession at a most object side of the first lens group; a second lens group having a negative refractive power and comprising a focusing lens configured to perform a focusing operation; and a third lens group having a positive refractive power and comprising a positive lens and a negative lens, wherein the first lens group, the second lens group, and the third lens group are sequentially arranged in a direction from an object side to an image side.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
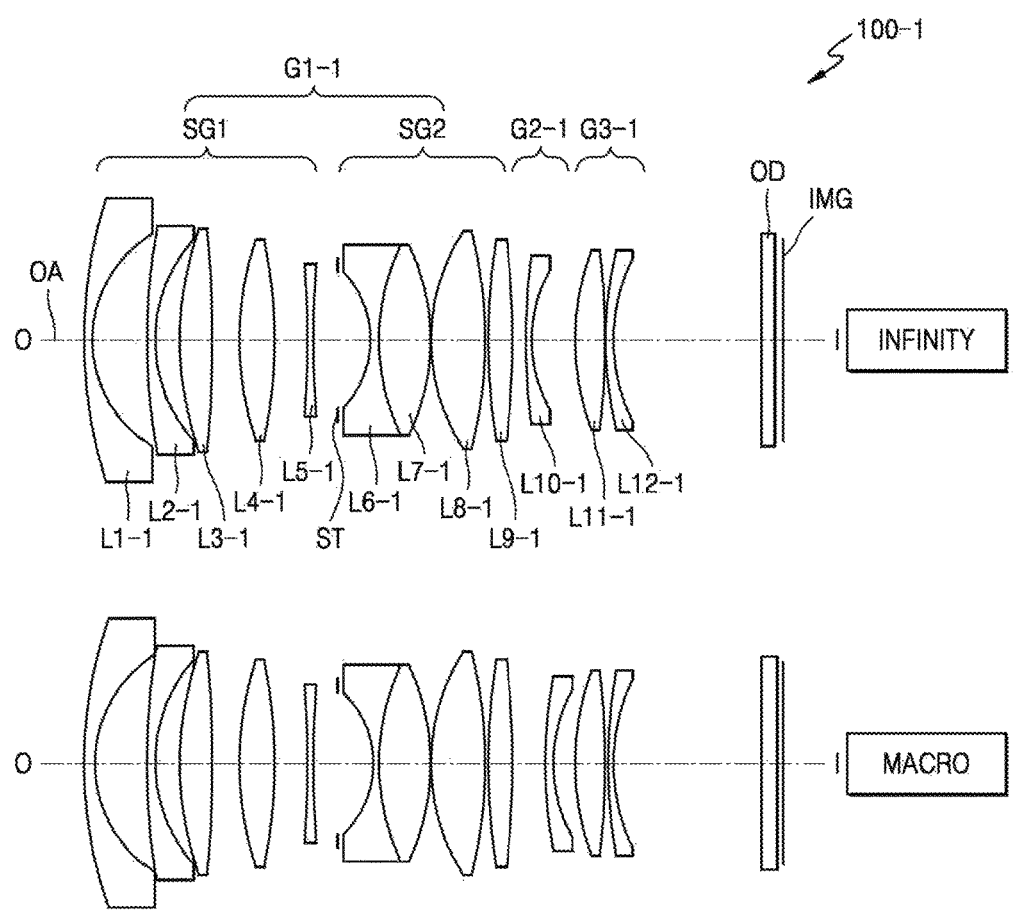
FIG. 1 is a diagram illustrating an example single focus lens set at infinity focus and macro focus according to a first example embodiment.

Hereinafter, single focus lenses and photographing apparatuses including the single focus lenses will be described according to various example embodiments with reference to the accompanying drawings. However, it should be understood that there is no intent to limit the present disclosure to the particular forms disclosed herein; rather, the present disclosure should be construed to cover various modifications, equivalents, and/or alternatives of embodiments. In describing the drawings, similar reference numerals may be used to designate similar constituent elements.

As used herein, the expressions "have", "may have", "include", or "may include" refer to the existence of a corresponding feature (e.g., numeral, function, operation, or constituent element, such as component), and do not exclude one or more additional features.

In the present disclosure, the expressions "A or B", "at least one of A and/or B", and "one or more of A and/or B" may include all possible combinations of the items listed. For example, the expressions "A or B", "at least one of A and B", or "at least one of A or B" refer to all of (1) including at least A, (2) including at least B, and (3) including all of at least A and at least B.

Expressions, such as "a first", "a second", "the first", or "the second", used herein may modify various elements regardless of the order and/or the importance of the elements. Such expressions are used to distinguish one element from other elements, but do not limit the corresponding elements. For example, a first user device and a second user device may indicate different user devices regardless of the order or importance of the user devices. For example, a first element may be referred to as a second element, and similarly, a second element may be referred to as a first element without departing from the scope of the present disclosure.

It should be understood that when an element (e.g., first element) is referred to as being (operatively or communicatively) "coupled," or "connected," to another element (e.g., second element), the first element may be coupled or connected directly to the second element or any other element (e.g., third element) may be interposed between the two elements. In contrast, it may be understood that when an element (e.g., first element) is referred to as being "directly coupled," or "directly connected" to another element (second element), there are no element (e.g., third element) interposed between the two elements.

The expression "configured to" used herein may be exchanged with, for example, "suitable for", "having the capacity to", "designed to", "adapted to", "made to", or "capable of" according to the situation. The expression "configured to" does not necessarily imply "specifically designed to" in hardware. Alternatively, in some situations, the expression "device configured to" may mean that the device, together with other devices or components, "is able to". For example, the phrase "processor configured (or adapted) to perform A, B, and C" may refer to a dedicated processor (e.g. an embedded processor) only for performing the corresponding operations or a generic-purpose processor (e.g., a central processing unit (CPU) or application processor (AP)) that may perform the corresponding operations by executing one or more software programs stored in a memory device.

Terms used herein are merely for the purpose of describing particular example embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the same meanings as the contextual meanings in the relevant field of art, and are not to be interpreted to have ideal or excessively formal meanings unless clearly defined herein. In some cases, even a term defined in the present disclosure should not be interpreted as a meaning of excluding some embodiments.

An electronic device, according to various embodiments, may include at least one of a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, or a wearable device, or the like, but is not limited thereto. According to various embodiments, the wearable device may include at least one of an accessory type (e.g., a watch, a ring, a bracelet, an anklet, a necklace, glasses, a contact lens, or a head-mounted Device (HMD)), a fabric or clothing integrated type (e.g., electronic clothing), a body-mounted type (e.g., a skin pad, or tattoo), or a bio-implantable type (e.g., an implantable circuit), or the like, but is not limited thereto.

According to some embodiments, the electronic device may be a home appliance. The home appliance may include at least one of, for example, a television, a digital versatile disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, or an electronic photo frame, or the like, but is not limited thereto.

According to another embodiment, the electronic device may include at least one of various medical devices such as portable medical measuring devices (e.g., a blood glucose monitoring device, a heart rate monitoring device, a blood pressure measuring device, or a body temperature measuring device), a magnetic resonance angiography (MRA) machine, a magnetic resonance imaging (MRI) machine, a computed tomography (CT) machine, or an ultrasonic machine, a navigation device, a global navigation satellite system (GNSS), an event data recorder (EDR), a flight data recorder (FDR), a vehicle infotainment device, an electronic device for a ship (e.g., a navigation device for a ship, and a gyro-compass), an avionics device, a security device, an automotive head unit, a robot for home or industry, an automatic teller's machine (ATM), a point of sales (POS) machine, or an Internet of Things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, or various kinds of measuring instruments (e.g., a water meter, an electric meter, a gas meter, or a radio wave meter), or the like, but is not limited thereto. The electronic device, according to various embodiments, may be a combination of one or more of the aforementioned various devices. In some embodiments, the electronic device may be a flexible device. Furthermore, the electronic device is not limited to the aforementioned devices, and may include a new electronic device according to the development of new techniques.

As used herein, the term "user" may indicate a person who uses an electronic device, or a device (e.g., an artificial intelligence electronic device) that uses an electronic device.

FIG. 1 is a diagram illustrating an example single focus lens 100-1 set at infinity focus and macro focus according to an example embodiment.

The single focus lens 100-1 may include a first lens group G1-1 having a positive refractive power, a second lens group G2-1 having a negative refractive power, a third lens group G3-1 having a positive refractive power. The first to third lens groups G1-1 to G3-1 may be sequentially arranged in a direction from an object side O to an image side I.

In the following description, the term "image side I" may refer to a side of an image plane IMG on which an image will be formed, and the term "object side O" may refer to a side of an object to be photographed. In the following description, an object side surface of a lens may refer to a surface of the lens facing the object, and an image side surface of a lens may refer to a surface of the lens facing the image plane IMG.

The first lens group G1-1 may include an aperture stop ST. The first lens group G1-1 may include a first sub-lens group SG1 arranged at an object side of the aperture stop ST, and a second sub-lens group SG2 arranged at an image side of the aperture stop ST.

The first sub-lens group SG1 of the first lens group G1-1 may include a first negative lens L1-1 and a second negative lens L2-1 that are arranged in succession at the most object side of the first sub-lens group SG1. Owing to the first negative lens L1-1 and the second negative lens L2-1, a lens system having a field of view in a standard-to-wide range may be implemented as a fast lens system having an F-number FNO of about 1.8 or less. For example, the single focus lens 100-1 of the embodiment may have an F-number FNO of about 1.4 or less. In this case, distortion and astigmatic aberration of the single focus lens 100-1 may be easily corrected at a wide angle of view, and it may be possible to design a high-performance lens system. For example, the single focus lens 100-1 of the embodiment may have a field of view within the range of about 55° to about 180°. For example, the single focus lens 100-1 of the embodiment may have a field of view within the range of about 55° to about 120°. For example, the single focus lens 100-1 of the embodiment may have a field of view within the range of about 55° to about 80°. For example, the single focus lens 100-1 of the embodiment may have a field of view within the range of about 55° to about 70°.

The first lens group G1-1 may include a lens configured to move in a direction perpendicular to an optical axis OA for handshaking compensation. For example, the first negative lens L1-1 may be a meniscus lens having a convex object side. For example, the second negative lens L2-1 may be a meniscus lens having a convex object side. Owing to the two negative lenses L1-1 and L2-1 arranged at the most object side of the single focus lens 100-1, the single focus lens 100-1 may easily have a wide field of view.

The second lens group G2-1 may be a focusing lens group configured to correct focusing position differences caused by variations in the position of the object.

A third lens L3-1 having a positive refractive power and a fourth lens L4-1 having a positive refractive power may be provided at an image side of the second negative lens L2-1 of the first lens group G1-1. For example, the third lens L3-1 may be a biconvex lens. For example, the fourth lens L4-1 may be a biconvex lens.

A fifth lens L5-1 may be provided between the fourth lens L4-1 and the aperture stop ST. For example, the fifth lens L5-1 may be a biconcave lens. The fifth lens L5-1 adjacent to the object side of the aperture stop ST may have a handshaking compensation function. Since the single focus lens 100-1 includes the fifth lens L5-1 having a handshaking compensation function at the object side of the aperture stop ST, image blurring caused by vibrations such as handshaking may be effectively compensated for.

For example, the second sub-lens group SG2 may include at least two positive lenses. For example, the second sub-lens group SG2 may include a sixth lens L6-1 having a negative refractive power, a seventh lens L7-1 having a positive refractive power, an eighth lens L8-1 having a positive refractive power, and a ninth lens L9-1 having a positive refractive power that are arranged at the image side of the aperture stop ST. The sixth lens L6-1 and the seventh lens L7-1 may be cemented together. For example, the eighth lens L8-1 and the ninth lens L9-1 may be biconvex lenses.

The second or fourth lens from the object side O may be an aspherical lens. If the second lens is an aspherical lens, distortion of the single focus lens 100-1 may easily be corrected, and if the fourth lens is an aspherical lens, spherical aberration and astigmatic aberration of the single focus lens 100-1 may easily be corrected. For example, in the first example embodiment, the fourth lens L4-1 may be an aspherical lens.

In the first example embodiment, the first lens group G1-1 includes the aperture stop ST, and if the aperture stop ST is placed at a position where the diameter of a light beam is minimal, the size of the aperture stop ST may be minimized and/or reduced. In addition, if the fifth lens L5-1 and the sixth lens L6-1 respectively placed at the object side and image side of the aperture stop ST have a biconcave shape, spherical aberration and sagittal coma that fast lens systems have in large amounts may easily be corrected.

In addition, if the first lens group G1-1 includes a doublet lens, sagittal coma and chromatic aberration occurring in fast lens systems may be effectively corrected.

If an aspherical lens is provided at the most image side of the first lens group G1-1, spherical aberration of an entire lens system may easily be corrected. Lenses of the second lens group G2-1 provided at the image side of the first lens group G1-1 may be smaller than lenses of the first lens group G1-1. For example, the ninth lens L9-1 may be an aspherical lens.

The second lens group G2-1 includes a negative meniscus lens that is concave toward the image side I. The second lens group G2-1 is a focusing lens group configured to correct focusing position differences caused by variations in the distance to an object. Since the second lens group G2-1 includes a single meniscus lens formed of a material having a d-line refractive index of about 1.85 or greater, when the distance to an object varies from infinity to proximity, variations in the performance of the second lens group G2-1 may be minimized, and a focusing movement of the second lens group G2-1 may be minimized. Therefore, optimized performance may be obtained even in an environment in which a fast lens having an F-number FNO of about 1.4 is required to perform rapid auto-focusing (AF).

For example, the second lens group G2-1 may include a tenth negative lens L10-1. For example, the tenth negative lens L10-1 may be a meniscus lens that is convex toward the object side O. Since the second lens group G2-1 having a focusing function is constituted by a single lens and is thus light, focusing may be rapidly performed.

For example, the third lens group G3-1 may include an eleventh positive lens L11-1 and a twelfth negative lens L12-1 in a direction from the object side O. For example, the eleventh positive lens L11-1 may be a biconvex lens. For example, the twelfth negative lens L12-1 may be a meniscus lens that is convex toward the object side O. The third lens group G3-1 closest to the image side I may be constituted by a small number of lenses to reduce the size of the single focus lens 100-1. Owing to the twelfth negative lens L12-1, the astigmatic aberration and astigmatic field curves of the entire lens system may easily be corrected.

Figure 3:
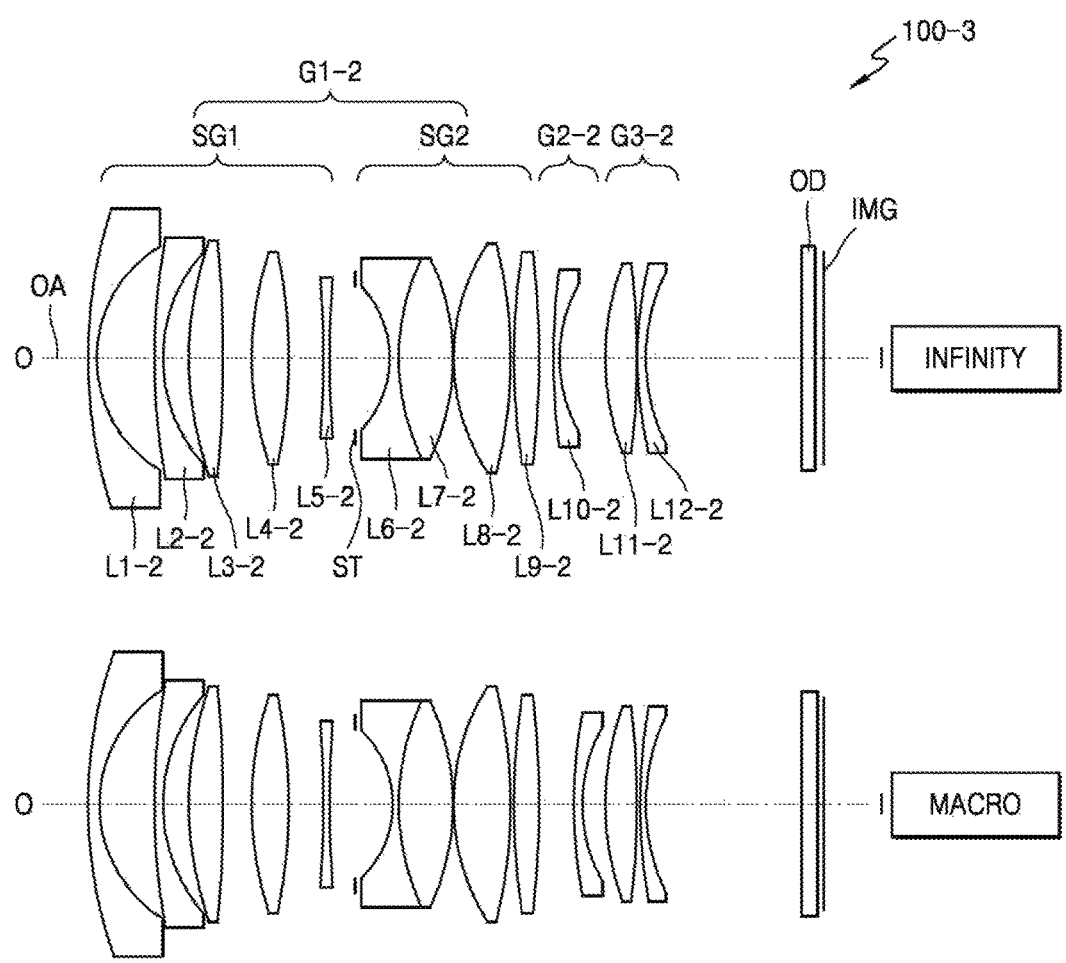
FIG. 3 is a diagram illustrating an example single focus lens set at infinity focus and macro focus according to a second example embodiment.

FIG. 3 is a diagram illustrating an example single focus lens 100-2 set at infinity focus and macro focus according to a second example embodiment.

According to the second example embodiment, the single focus lens 100-2 may include a first lens group G1-2 having a positive refractive power, a second lens group G2-2 having a negative refractive power, a third lens group G3-2 having a positive refractive power. The first to third lens groups G1-2 to G3-2 may be sequentially arranged in a direction from an object side O to an image side I.

Elements of the second example embodiment having structures similar to those of the elements of the first example embodiment will not be repeatedly described. The first lens group G1-2 may include a first negative lens L1-2 and a second negative L2-2 at the most object side of the first lens group G1-2. Five lenses L1-2, L2-2, L3-2, L4-2, and L5-2 may be provided at an object side of an aperture stop ST, and four lenses L6-2, L7-2, L8-2, and L9-2 may be provided at an image side of the aperture stop ST. The lens L5-2 provided at the object side of the aperture stop ST may have a handshaking compensation function. The second lens group G2-2 may be used for focusing and may include a tenth negative lens L10-2. The third lens group G3-2 may include an eleventh positive lens L11-2 and a twelfth negative lens L12-2.

Figure 5:
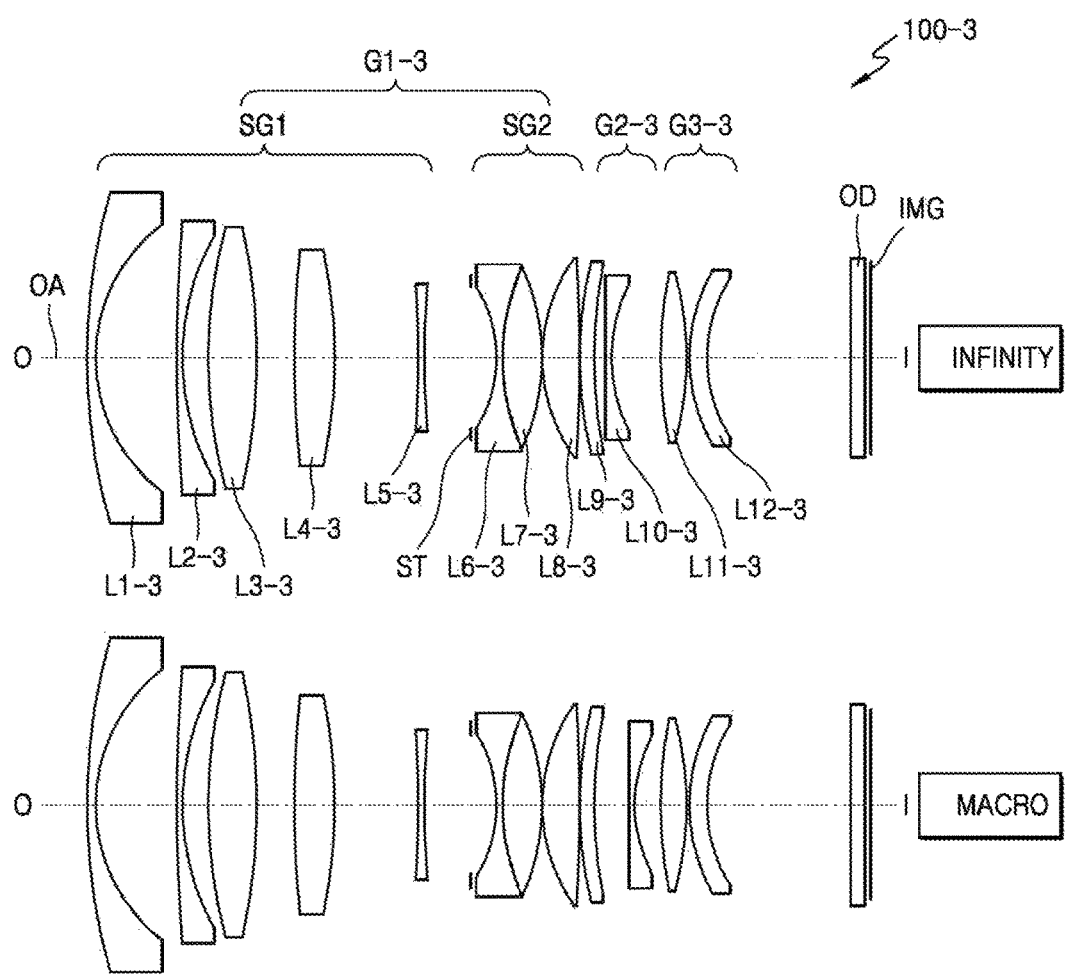
FIG. 5 is a diagram illustrating an example single focus lens set at infinity focus and macro focus according to a third example embodiment.

FIG. 5 is a diagram illustrating an example single focus lens 100-3 set at infinity focus and macro focus according to a third example embodiment.

According to the third example embodiment, the single focus lens 100-3 may include a first lens group G1-3 having a positive refractive power, a second lens group G2-3 having a negative refractive power, a third lens group G3-3 having a positive refractive power. The first to third lens groups G1-3 to G3-3 may be sequentially arranged in a direction from an object side O to an image side I.

Elements of the third example embodiment having structures similar to those of the elements of the first example embodiment will not be repeatedly described. The first lens group G1-3 may include a first negative lens L1-3 and a second negative L2-3 at the most object side of the first lens group G1-3. Five lenses L1-3, L2-3, L3-3, L4-3, and L5-3 may be provided at an object side of an aperture stop ST, and four lenses L6-3, L7-3, L8-3, and L9-3 may be provided at an image side of the aperture stop ST. The lens L5-3 provided at the object side of the aperture stop ST may have a handshaking compensation function. The second lens group G2-3 may be used for focusing and may include a tenth negative lens L10-3. The third lens group G3-3 may include an eleventh positive lens L11-3 and a twelfth negative lens L12-3.

Figure 7:
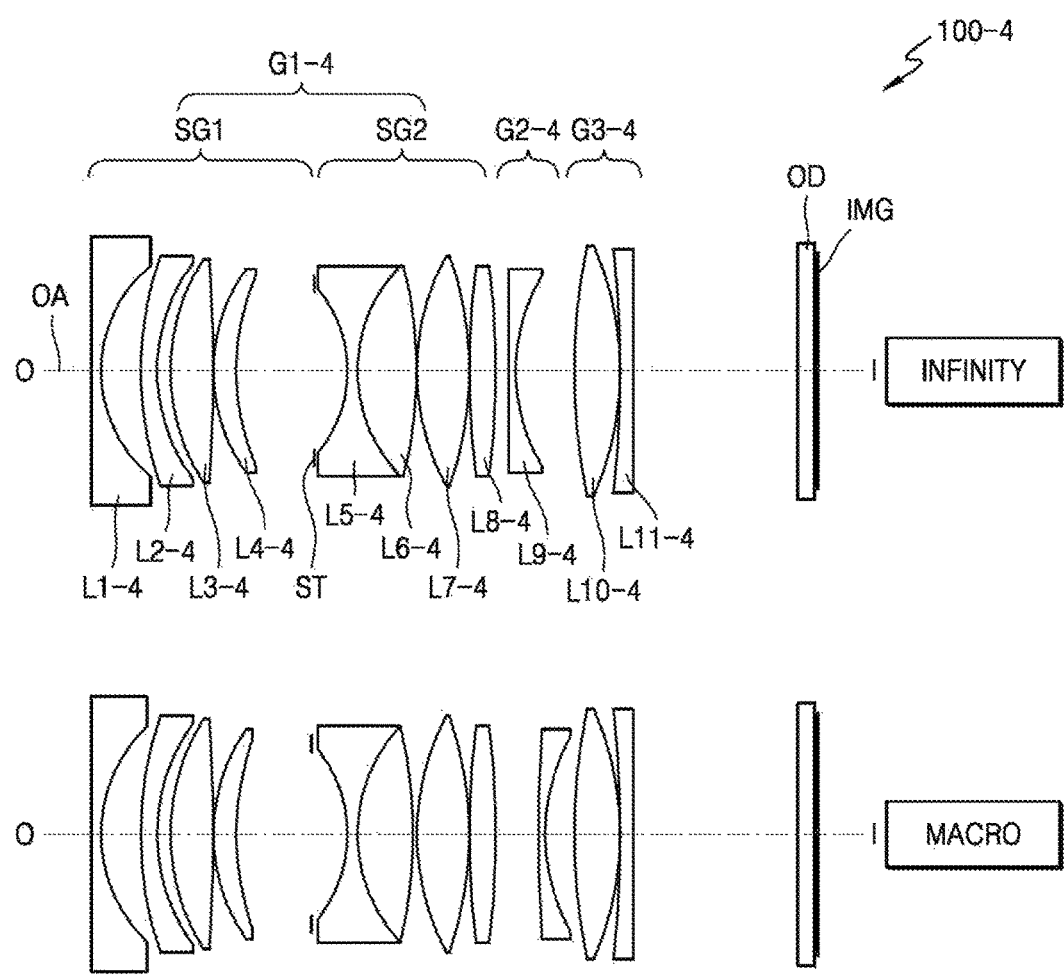
FIG. 7 is a diagram illustrating an example single focus lens set at infinity focus and macro focus according to a fourth example embodiment.

FIG. 7 is a diagram illustrating an example single focus lens 100-4 set at infinity focus and macro focus according to a fourth example embodiment.

According to the fourth example embodiment, the single focus lens 100-4 may include a first lens group G1-4 having a positive refractive power, a second lens group G2-4 having a negative refractive power, a third lens group G3-4 having a positive refractive power. The first to third lens groups G1-4 to G3-4 may be sequentially arranged in a direction from an object side O to an image side I.

Elements of the fourth example embodiment having structures similar to those of the elements of the first example embodiment will not be repeatedly described. The first lens group G1-4 may include a first negative lens L1-4 and a second negative L2-4 at the most object side of the first lens group G1-4. Four lenses L1-4, L2-4, L3-4, and L4-4 may be provided at an object side of an aperture stop ST, and four lenses L5-4, L6-4, L7-4, and L8-4 may be provided at an image side of the aperture stop ST. In the fourth example embodiment, a lens for preventing image blurring caused by handshaking may not be used. The second lens group G2-4 may be used for focusing and may include a ninth negative lens L9-5. The third lens group G3-5 may include a tenth positive lens L10-4 and an eleventh negative lens L11-4.

Figure 9:
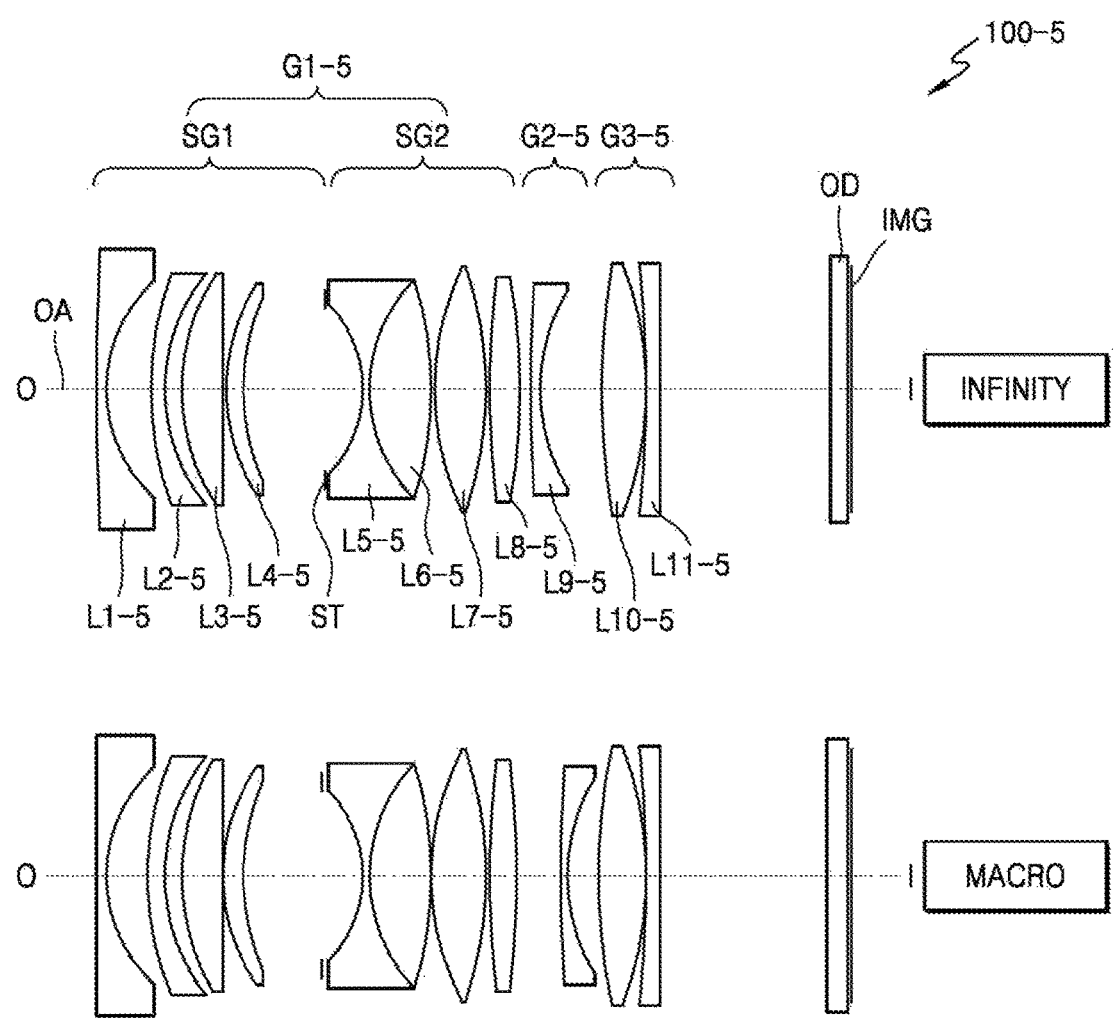
FIG. 9 is a diagram illustrating an example single focus lens set at infinity focus and macro focus according to a fifth example embodiment.

FIG. 9 is a diagram illustrating an example single focus lens 100-5 set at infinity focus and macro focus according to a fifth example embodiment.

According to the fifth example embodiment, the single focus lens 100-5 may include a first lens group G1-5 having a positive refractive power, a second lens group G2-5 having a negative refractive power, a third lens group G3-5 having a positive refractive power. The first to third lens groups G1-5 to G3-5 may be sequentially arranged in a direction from an object side O to an image side I.

Elements of the fifth example embodiment having structures similar to those of the elements of the first example embodiment will not be repeatedly described. The first lens group G1-5 may include a first negative lens L1-5 and a second negative L2-5 at the most object side of the first lens group G1-5. Four lenses L1-5, L2-5, L3-5, and L4-5 may be provided at an object side of an aperture stop ST, and four lenses L5-5, L6-5, L7-5, and L8-5 may be provided at an image side of the aperture stop ST. In the fifth example embodiment, a lens for preventing image blurring caused by handshaking may not be used. The second lens group G2-5 may be used for focusing and may include a ninth negative lens L9-5. The third lens group G3-5 may include a tenth positive lens L10-5 and an eleventh negative lens L11-5.

Figure 11:
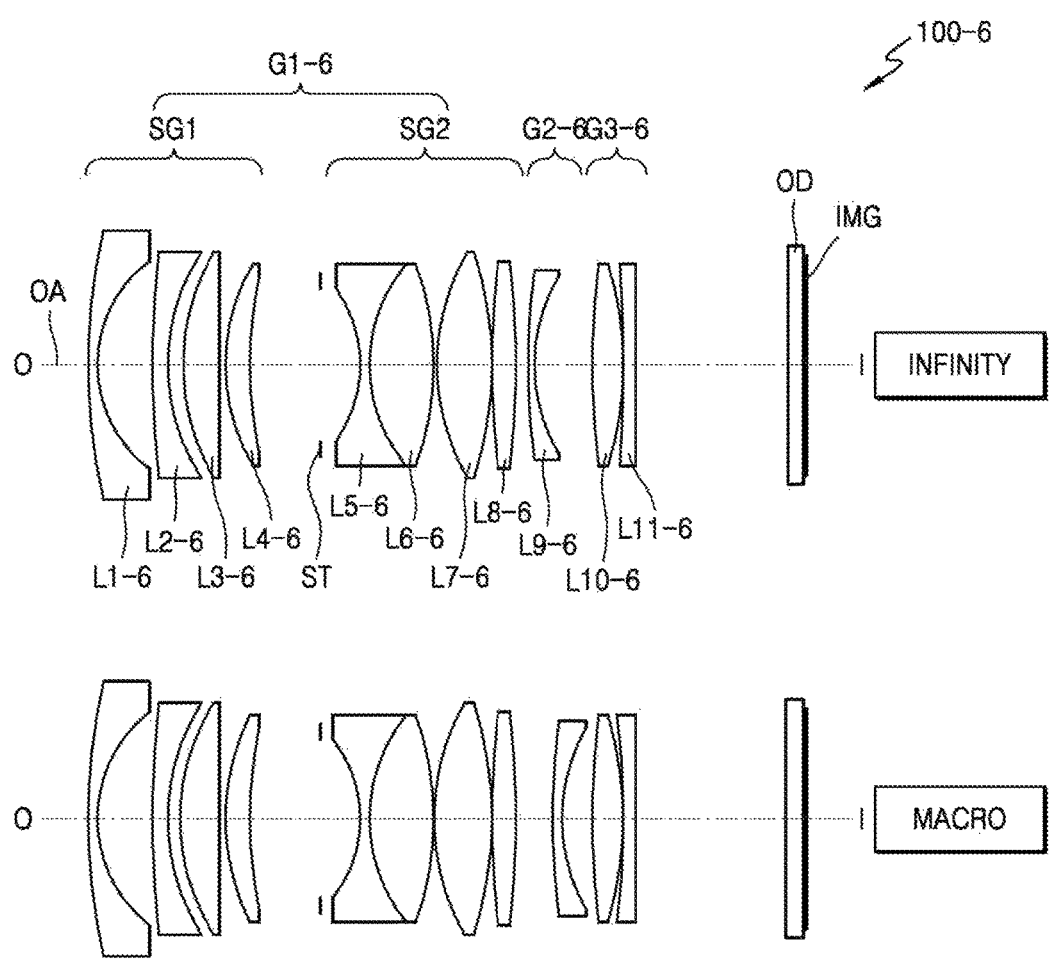
FIG. 11 is a diagram illustrating an example single focus lens set at infinity focus and macro focus according to a sixth example embodiment.

FIG. 11 is a diagram illustrating an example single focus lens 100-6 set at infinity focus and macro focus according to a sixth example embodiment.

According to the sixth example embodiment, the single focus lens 100-6 may include a first lens group G1-6 having a positive refractive power, a second lens group G2-6 having a negative refractive power, a third lens group G3-6 having a positive refractive power. The first to third lens groups G1-6 to G3-6 may be sequentially arranged in a direction from an object side O to an image side I.

Elements of the sixth example embodiment having structures similar to those of the elements of the previous embodiments will not be repeatedly described. The first lens group G1-6 may include a first negative lens L1-6 and a second negative lens L2-6 at the most object side of the first lens group G1-6. Four lenses L1-6, L2-6, L3-6, and L4-6 may be provided at an object side of an aperture stop ST, and four lenses L5-6, L6-6, L7-6, and L8-6 may be provided at an image side of the aperture stop ST. In the sixth example embodiment, a lens for preventing image blurring caused by handshaking may not be used. The second lens group G2-6 may be used for focusing and may include a ninth negative lens L9-6. The third lens group G3-6 may include a tenth positive lens L10-6 and an eleventh negative lens L11-6.

Figure 13:
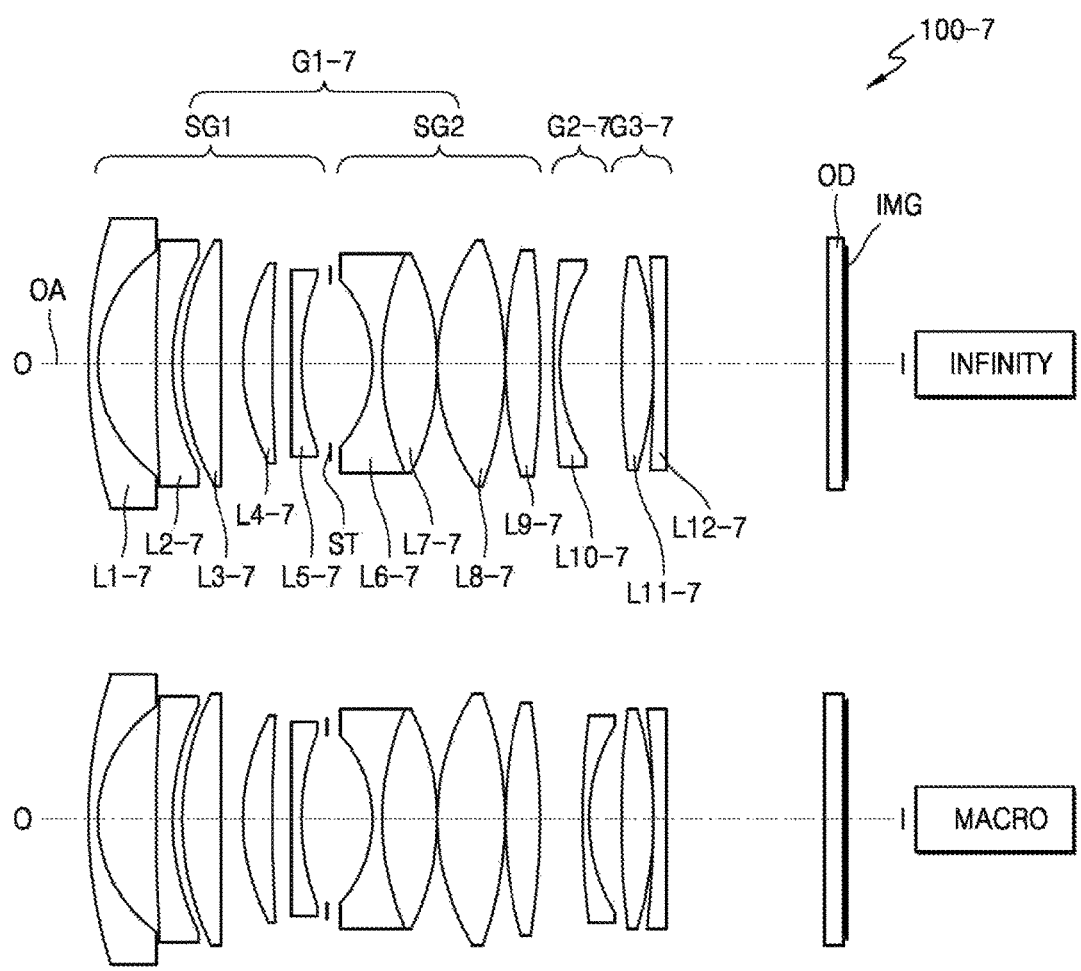
FIG. 13 is a diagram illustrating an example single focus lens set at infinity focus and macro focus according to a seventh example embodiment.

FIG. 13 is a diagram illustrating an example single focus lens 100-7 set at infinity focus and macro focus according to a seventh example embodiment.

According to the seventh example embodiment, the single focus lens 100-7 may include a first lens group G1-7 having a positive refractive power, a second lens group G2-7 having a negative refractive power, a third lens group G3-7 having a positive refractive power. The first to third lens groups G1-7 to G3-7 may be sequentially arranged in a direction from an object side O to an image side I.

Elements of the seventh example embodiment having structures similar to those of the elements of the first example embodiment will not be repeatedly described. The first lens group G1-7 may include a first negative lens L1-7 and a second negative L2-7 at the most object side of the first lens group G1-7. Five lenses L1-7, L2-7, L3-7, L4-7, and L5-7 may be provided at an object side of an aperture stop ST, and four lenses L6-7, L7-7, L8-7, and L9-7 may be provided at an image side of the aperture stop ST. The lens L5-7 provided at the object side of the aperture stop ST may have a handshaking compensation function. The second lens group G2-7 may be used for focusing and may include a tenth negative lens L10-7. The third lens group G3-7 may include an eleventh positive lens L11-7 and a twelfth negative lens L12-7.

According to the one or more of the above example embodiments, an image of an object may pass through the first lens group, the second lens group, and the third lens group, and may then reach the image plane IMG. For example, the image plane IMG may be a surface of an imaging device or an image sensor. For example, the image sensor may include a CMOS or a CCD.

At least one optical element OD may be provided between the third lens group and the image plane IMG. The optical element OD may include, for example, at least one of a low-pass filter, an infrared (IR)-cut filter, or cover glass, or the like. For example, if the optical element OD includes an IR-cut filter, visible light rays may pass through the optical element OD but infrared rays may not pass through the optical element OD. Thus, infrared rays may not reach the image plane IMG. However, a single focus lens not including an optical element may be provided.

Each of the single focus lenses 100-1, 100-2, 100-3, 100-4, 100-5, 100-6, and 100-7 of the various example embodiments may satisfy Expression 1 below:

$$0.4 \leq f1/f \leq 1.3 \qquad \text{<Expression 1>}$$

where f1 denotes the focal length of the first lens group, and f denotes the total focal length of the single focus lens.

If f1/f exceeds the upper limit of Expression 1, the focal length of the first lens group may be excessively large compared to the total focal length and thus the second lens group may have a large size. Due to the large size of the second lens group, the size of the single focus lens may increase. If f1/1 is smaller than the lower limit of Expression 1, it may be difficult to correct aberrations of the single focus lens even though it may be easy to reduce the size of a lens barrel.

The first lens from the object side of the aperture stop of the first lens group may be configured as a handshaking compensation lens so as to minimize and/or reduce aberration variations during a handshaking compensation operation, and in this case, the size of the handshaking compensation lens may be minimized.

Each of the single focus lenses 100-1, 100-2, 100-3, 100-4, 100-5, 100-6, and 100-7 of the various example embodiments may satisfy Expression 2 below:

$$1.85 \leq N2 \leq 2.1 \qquad \text{<Expression 2>}$$

where N2 denotes the refractive index of a focusing lens of the second lens group at the d-line wavelength. The d-line wavelength may be 587.5612 nm.

If N2 exceeds the upper limit of Expression 2, the amount of movement of the focusing lens relevant to variations in the distance to an object may be reduced owing to a high refractive index of the focusing lens. However, the Abbe number of the focusing lens may be about 20 or less, and thus aberration variations caused by variations in the position of the focusing lens may increase, thereby making it difficult to guarantee the optical performance of the single focus lens. If N2 is smaller than the lower limit of Expression 2, aberration variations caused by variations in the position of the focusing lens may be minimized and/or reduced. However, variations in the position of the focusing lens relevant to the position of an object may increase, and thus the size of the single focus lens may increase.

Each of the single focus lenses 100-1, 100-2, 100-3, 100-4, 100-5, 100-6, and 100-7 of the various example embodiments may satisfy Expression 3 below:

$$-2.0 \leq f2/f \leq -0.7 \qquad \text{<Expression 3>}$$

where f2 denotes the focal length of the focusing lens of the second lens group, and f denotes the total focal length of the single focus lens.

If f2/f exceeds the upper limit of Expression 3, the focal length of the second lens group is short, and thus the amount of movement of the focusing lens may be reduced. However, aberration variations caused by variations in the position of the focusing lens may increase, and thus it may be difficult to guarantee the optical performance of the single focus lens. If f2/f is smaller than the lower limit of Expression 3, aberration variations caused by variations in the position of the focusing lens may be minimized and/or reduced. However, variations in the position of the focusing lens relevant to the position of an object may increase, and thus the size of the single focus lens may increase.

Each of the single focus lenses 100-1, 100-2, 100-3, 100-4, 100-5, 100-6, and 100-7 of the various example embodiments may satisfy Expression 4 below:

$$-100 \leq f1a \leq -10 \qquad \text{<Expression 4>}$$

where f1a denotes the combined focal length of the first and second negative lenses of the first lens group. If f1a exceeds the upper limit of Expression 4, the size of the single focus lens may be decreased because the combined focal length is short. However, it may be difficult to guarantee the optical performance of the single focus lens because of large aberration variations. If f1a is smaller than the lower limit of Expression 4, the size of an entire optical system may increase.

Each of the single focus lenses 100-1, 100-2, 100-3, 100-4, 100-5, 100-6, and 100-7 of the various example embodiments may satisfy Expression 5 below:

$$-2 \leq f1a/f1b \leq -0.5 \qquad \text{<Expression 5>}$$

where f1a denotes the combined focal length of the first and second negative lenses of the first lens group, and f1b denotes the combined focal length of the third and fourth positive lenses of the first lens group. If f1a/f1b exceeds the upper limit of Expression 5, the size of the single focus lens may be reduced because the combined focal length of the first and second lenses from an object side is excessively small compared to the combined focal length of the third and fourth lenses from the object side. However, it may be difficult to guarantee the optical performance of the single focus lens because of large aberration variations. If f1a/f1b is smaller than the lower limit of Expression 5, the size of the entire optical system may increase even though aberrations are easily corrected.

Each of the single focus lenses 100-1, 100-2, 100-3, 100-4, 100-5, 100-6, and 100-7 of the various example embodiments may satisfy Expression 6 below:

$$-20 \leq f3b/f3a \leq -1 \qquad \text{<Expression 6>}$$

where f3a denotes the focal length of the positive lens of the third lens group, and f3b denotes the focal length of the negative lens of the third lens group. If f3b/f3a exceeds the upper limit of Expression 6, the focal length of the negative lens is shorter than the focal length of the positive lens, and thus the size of the entire optical system may increase even though astigmatic aberration occurring on the image plane IMG is easily corrected. If f3b/f3a is smaller than the lower limit of Expression 6, it may be difficult to correct the astigmatic aberration of the single focus lens even though the size of the single focus lens may decrease.

In the descriptions of the single focus lenses of the embodiments, the term "aspherical surface" or "aspherical shape" may have the following definition.

When an optical axis is set as an x-axis, a direction perpendicular to the optical axis is set as a y-axis, and the propagation direction of rays is denoted as a positive direction, an aspherical surface of a lens may be defined by Expression 7 below. In Expression 7, x denotes a distance measured from the vertex of the lens in the direction of the optical axis of the lens, y denotes a distance measured from the optical axis in a direction perpendicular to the optical axis, K denotes a conic constant, A, B, C, D, . . . denote aspherical coefficients, and c denotes the reciprocal (1/R) of the radius of curvature at the vertex of the lens.

$$x = \frac{cy^2}{1 + \sqrt{1 - (K+1)c^2 y^2}} + Ay^4 + By^6 + Cy^8 + Dy^{10} + \ldots \qquad \text{<Expression 7>}$$

Variously designed single focus lenses may be provided according to the following example embodiments.

In the following example embodiments, lens surfaces in tables are sequentially numbered with 1, 2, 3, . . . , n (n is a natural number) in a direction from an object side O to an image side I, and lens surfaces are not numbered in drawings. In addition, f denotes the total focal length of a single focus lens, FNO denotes an F-number, 2w denotes a field of view, OBJ denotes an object (subject), RDY denotes a radius of curvature, THI denotes the thickness of a lens or an air gap between lenses, Nd denotes a refractive index, and Vd denotes an Abbe number. In addition, ST refers to an aperture stop, and ASP refers to an aspherical surface.

First Example Embodiment

FIG. 1 illustrates the single focus lens of the first example embodiment, and design data for the single focus lens of the first example embodiment is as follows.

f: 23.31 FNO: 1.44 2ω: 63.7

TABLE 1

| Lens surfaces | RDY | THI | Nd | Vd |
|---|---|---|---|---|
| OBJ: | INFINITY | INFINITY | | |
| 1: | 92.029 | 1.50 | 1.48748 | 70.4 |
| 2: | 18.747 | 7.02 | | |
| 3: | 53.744 | 1.20 | 1.49699 | 81.6 |
| 4: | 22.298 | 3.67 | | |
| 5: | 44.204 | 6.04 | 1.80518 | 25.4 |
| 6: | −91.229 | 3.60 | | |
| 7: | 146.238 | 5.14 | 1.58650 | 60.5 |
| | ASP: | | | |
| | K: −1.000000 | | | |
| | A: 0.878995E−05 B: 0.714380E−08 | | | |
| | C: 0.114527E−09 D: −.398264E−12 | | | |
| 8: | −84.717 | 5.64 | | |
| | ASP: | | | |
| | K: −1.000000 | | | |
| | A: −.139904E−04 B: −.183056E−07 | | | |
| | C: −.178940E−10 D: 0.000000E+00 | | | |
| 9: | −122.062 | 0.90 | 1.84666 | 23.7 |
| 10: | 122.062 | 3.35 | | |
| ST | INFINITY | 5.07 | | |
| 12: | −14.893 | 1.00 | 1.78471 | 25.7 |
| 13: | 33.819 | 7.12 | 1.80420 | 46.5 |
| 14: | −33.819 | 0.15 | | |
| 15: | 30.739 | 7.70 | 1.59282 | 68.6 |
| 16: | −65.273 | 0.15 | | |
| 17: | 41.435 | 4.46 | 1.80470 | 40.8 |
| | ASP: | | | |
| | K: −1.000000 | | | |
| | A: −.556833E−05 B: −.178647E−08 | | | |
| | C: 0.000000E+00 D: 0.000000E+00 | | | |
| 18: | −75.524 | D1 | | |
| | ASP: | | | |
| | K: −1.000000 | | | |
| | A: 0.183485E−04 B: −.184603E−07 | | | |
| | C: 0.357986E−10 D: 0.319581E−13 | | | |
| 19: | 77.069 | 1.00 | 1.95374 | 32.3 |
| 20: | 21.721 | D2 | | |
| 21: | 34.943 | 4.46 | 1.84666 | 23.7 |
| 22: | −100.918 | 0.15 | | |
| 23: | 38.373 | 1.00 | 1.80518 | 25.4 |
| 24: | 22.937 | 22.04 | | |
| 25: | INFINITY | 2.00 | 1.51679 | 64.2 |
| 26: | INFINITY | 1.05 | | |
| IMG: | INFINITY | | | |

Table 2 below illustrates variable distances in the first example embodiment.

TABLE 2

| Variable distances | Infinity | Macro |
|---|---|---|
| D1 | 1.6979 | 4.5066 |
| D2 | 6.2938 | 3.4851 |

Macro may refer to 85 mm. This may be applied to the other example embodiments.

Figure 2:
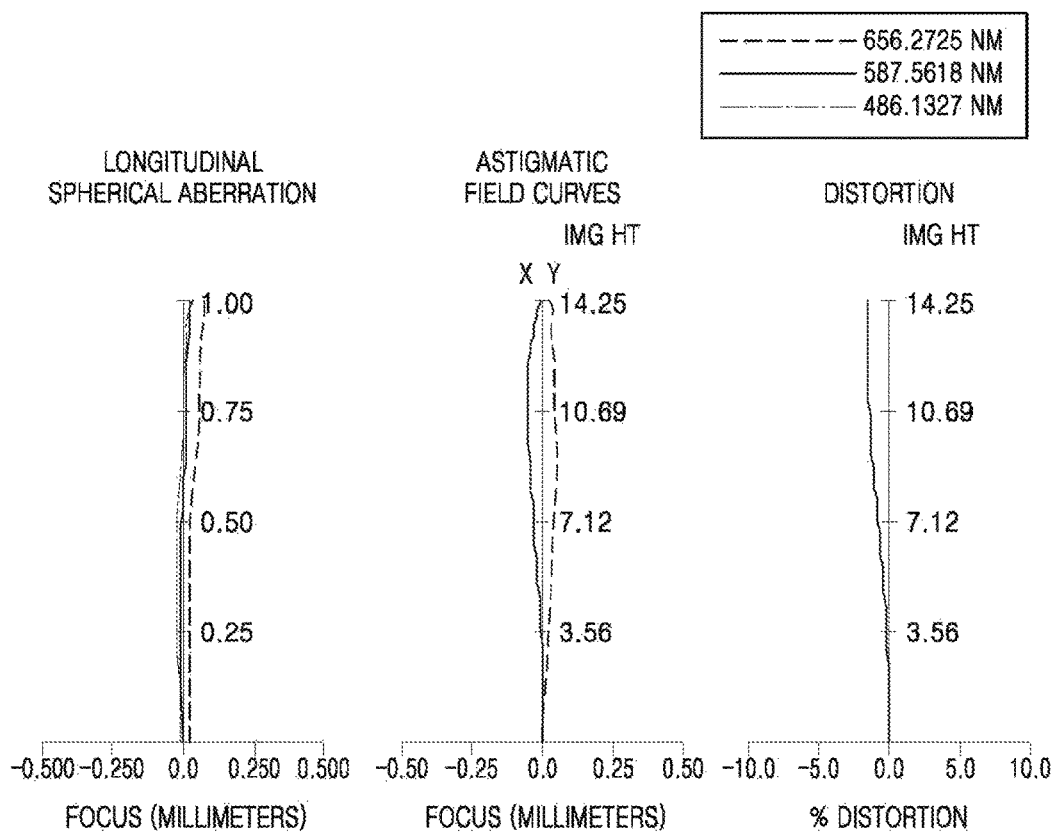
FIG. 2 includes aberration diagrams of the single focus lens illustrated in FIG. 1.

FIG. 2 illustrates longitudinal spherical aberration, astigmatic field curves, and distortion of the single focus lens of the first example embodiment when set at infinity focus and macro focus. For example, the longitudinal spherical aberration was measured with light having a wavelength of 656.2725 nanometers (NM), 587.5618 NM, and 486.1327 NM. The astigmatic field curves include a tangential field curvature T and a sagittal field curvature S. The astigmatic field curves were measured with light having a wavelength of 656.2725 NM and 587.5618 NM, and the distortion was measured with light having a wavelength of 587.5618 NM. This description may also be applied to aberration diagrams of the other example embodiments.

Second Example Embodiment

FIG. 3 illustrates the single focus lens of the second example embodiment, and design data for the single focus lens of the second example embodiment is as follows.

f: 23.28 FNO: 1.45 2ω: 63.92

TABLE 3

| Lens surfaces | RDY | THI | Nd | Vd |
|---|---|---|---|---|
| OBJ: | INFINITY | INFINITY | | |
| 1: | 62.676 | 1.5 | 1.51679 | 64.2 |
| 2: | 18.224 | 7.62 | | |
| 3: | 90.592 | 1.3 | 1.4968 | 81.6 |
| 4: | 22.736 | 3.35 | | |
| 5: | 46.109 | 5.03 | 1.89636 | 26.1 |
| 6: | −125.51 | 3.67 | | |
| 7: | 65.432 | 5.22 | 1.60494 | 57.6 |
| | ASP: | | | |
| | K: 3.779693, | | | |
| | A: 0.933737E−05 B: 0.101140E−07 | | | |
| | C: 0.194824E−09 D: −.534308E−12 | | | |
| 8: | −109.206 | 4.56 | | |
| | ASP: | | | |
| | K: 27.747122 | | | |
| | A: −.115367E−04 B: −.469384E−08 | | | |
| | C: −.612592E−12 D: 0.000000E+00 | | | |
| 9: | −166.976 | 1 | 1.92039 | 22.8 |
| 10: | 112.107 | 3.4 | | |
| STO: | INFINITY | 5.06 | | |
| 12: | −14.371 | 1 | 1.74191 | 27.7 |
| 13: | 31.649 | 7.35 | 1.78979 | 47.8 |
| 14: | −33.906 | 0.15 | | |
| 15: | 28.356 | 7.89 | 1.59282 | 68.6 |
| 16: | −64.06 | 0.15 | | |
| 17: | 49.501 | 3.89 | 1.8047 | 40.9 |
| | ASP: | | | |
| | K: −1.000000 | | | |
| | A: −.931162E−05 B: −.297045E−07 | | | |
| | C: 0.000000E+00 D: 0.000000E+00 | | | |
| 18: | −74.843 | D1 | | |
| | ASP: | | | |
| | K: −1.000000 | | | |
| | A: 0.168570E−04 B: −.484049E−07 | | | |
| | C: 0.101168E−09 D: −.107316E−12 | | | |
| 19: | 69.895 | 1 | 1.95375 | 32.3 |
| 20: | 21.431 | D2 | | |
| 21: | 35.047 | 4.49 | 1.82882 | 24.5 |
| 22: | −95.282 | 0.15 | | |
| 23: | 54.955 | 1 | 1.84666 | 23.8 |
| 24: | 28.61 | 21.4 | | |
| 25: | INFINITY | 2 | 1.5168 | 64.2 |
| 26: | INFINITY | 1.03 | | |
| IMG: | INFINITY | | | |

Table 4 below illustrates variable distances in the second example embodiment.

TABLE 4

| Variable distances | Infinity | Macro |
|---|---|---|
| D1 | 1.7 | 4.7497 |
| D2 | 6.0785 | 3.0288 |

Figure 4:
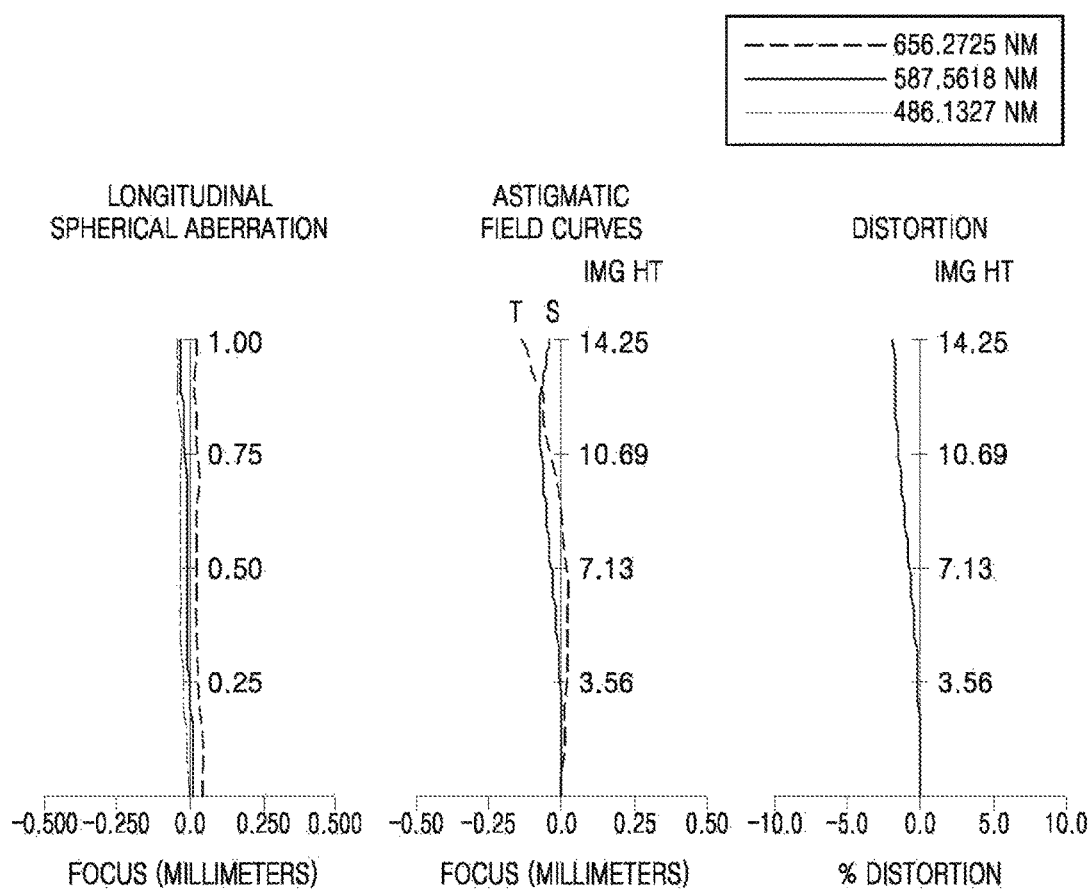
FIG. 4 includes aberration diagrams of the single focus lens illustrated in FIG. 3.

FIG. 4 illustrates longitudinal spherical aberration, astigmatic field curves, and distortion of the single focus lens of the second example embodiment when set at infinity focus and macro focus.

Third Example Embodiment

FIG. 5 illustrates the single focus lens of the third example embodiment, and design data for the single focus lens of the third example embodiment is as follows.

f: 24.7 FNO: 1.44 2ω: 61.0

TABLE 5

| Lens surfaces | RDY | THI | Nd | Vd |
|---|---|---|---|---|
| OBJ: | INFINITY | INFINITY | | |
| 1: | 85.266 | 1.5 | 1.497 | 81.6 |
| 2: | 25.513 | 12.23 | | |
| 3: | 225.961 | 1.2 | 1.497 | 81.6 |
| 4: | 39.439 | 3.67 | | |
| 5: | 76.95 | 7.42 | 1.84107 | 24 |
| 6: | −101.427 | 6.08 | | |
| 7: | 123.892 | 6 | 1.58865 | 60.5 |
| ASP: | ASP: | | | |
| | K: −1.000000 | | | |
| | A: −.387534E−05 B: 0.165866E−08 | | | |
| | C: 0.268444E−10 D: −.557262E−13 | | | |
| 8: | −121.499 | 12.68 | | |
| ASP: | ASP: | | | |
| | K: −1.000000 | | | |
| | A: −.107899E−04 B: 0.130686E−07 | | | |
| | C: −.220465E−10 D: 0.000000E+00 | | | |
| 9: | −107.864 | 0.9 | 1.94595 | 18 |
| 10: | 107.864 | 7.23 | | |
| STO: | INFINITY | 3.64 | | |
| 12: | −22.055 | 1 | 1.78472 | 25.7 |
| 13: | 32.767 | 6.3 | 1.834805 | 42.7 |
| 14: | −32.767 | 0.15 | | |
| 15: | 26.172 | 5.51 | 1.8291 | 42 |
| 16: | −197.764 | 0.15 | | |
| 17: | 71.979 | 2.06 | 1.8047 | 40.9 |
| ASP: | ASP: | | | |
| | K: −1.000000 | | | |
| | A: 0.167662E−05 B: −.113856E−07 | | | |
| | C: 0.000000E+00 D: 0.000000E+00 | | | |
| 18: | 204.898 | D1 | | |
| ASP: | ASP: | | | |
| | K: −1.000000 | | | |
| | A: 0.226899E−04 B: −.269149E−07 | | | |
| | C: 0.109957E−09 D: −.118579E−12 | | | |
| 19: | 896.998 | 1 | 1.91821 | 24.7 |
| 20: | 24.26 | D2 | | |
| 21: | 66.635 | 3.96 | 1.8539 | 23.4 |
| 22: | −44.395 | 0.15 | | |
| 23: | 25.667 | 3 | 1.80518 | 25.5 |
| 24: | 22.938 | 21.92 | | |
| 25: | INFINITY | 2 | 1.5168 | 64.2 |
| 26: | INFINITY | 1.03 | | |
| IMG: | INFINITY | | | |

Table 6 below illustrates variable distances in the third example embodiment.

TABLE 6

| Variable distances | Infinity | Macro |
|---|---|---|
| D1 | 1.7 | 5.3826 |
| D2 | 7.5629 | 3.8803 |

Figure 6:
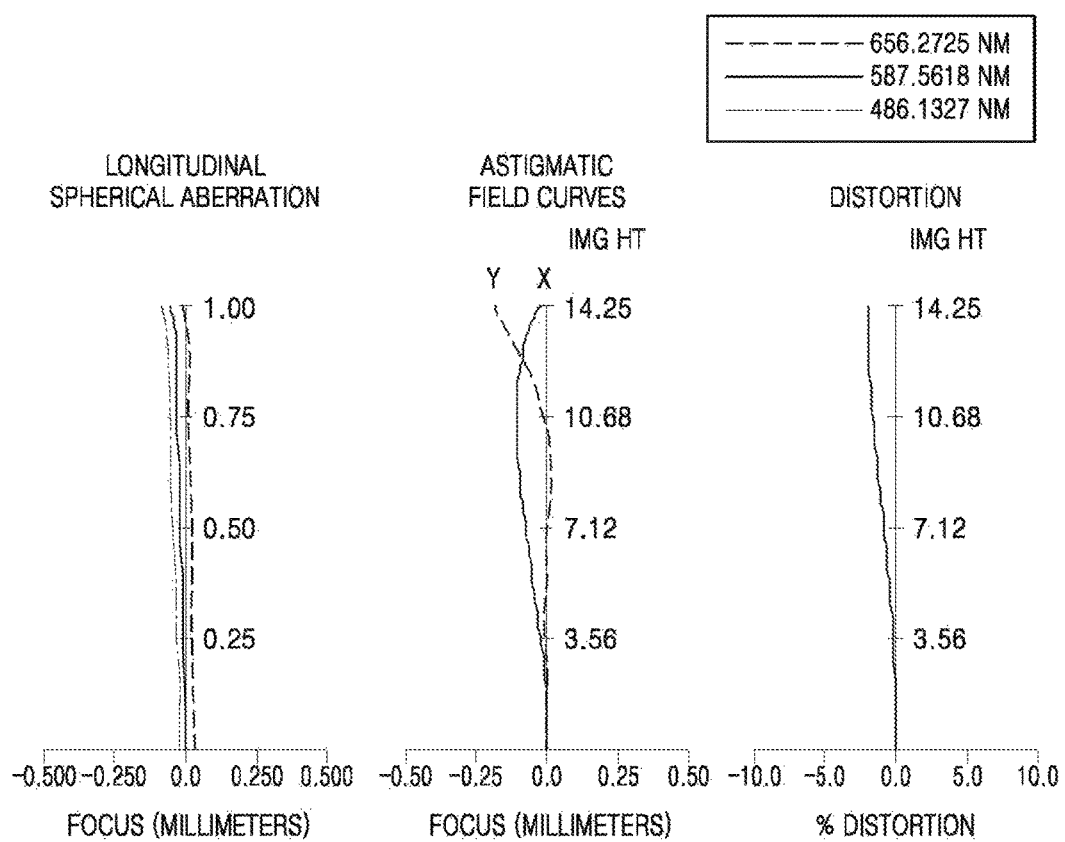
FIG. 6 includes aberration diagrams of the single focus lens illustrated in FIG. 5.

FIG. 6 illustrates longitudinal spherical aberration, astigmatic field curves, and distortion of the single focus lens of the third example embodiment when set at infinity focus and macro focus.

Fourth Example Embodiment

FIG. 7 illustrates the single focus lens of the fourth example embodiment, and design data for the single focus lens of the fourth example embodiment is as follows.

f: 24.53 FNO: 1.45 2ω: 60.78

TABLE 7

| Lens surfaces | RDY | THI | Nd | Vd |
|---|---|---|---|---|
| OBJ: | INFINITY | INFINITY | | |
| 1: | INFINITY | 0 | | |
| 2: | 1000 | 1.4 | 1.58144 | 40.9 |
| 3: | 17.199 | 4.64 | | |
| 4: | 41.025 | 1.8 | 1.5147 | 63.7 |
| 5: | 16.676 | 1.88 | | |
| ASP: | ASP: | | | |
| | K: −1.000000 | | | |
| | A: −.208216E−04 B: −.551344E−07 | | | |
| | C: 0.140478E−09 D: −.857447E−12 | | | |
| 6: | 26.571 | 4.91 | 1.883 | 40.8 |
| 7: | −277.649 | 0 | | |
| 8: | 42.075 | 0.1 | | |
| 9: | 21.711 | 2.57 | 2.001 | 29.1 |
| 10: | 30.057 | 9.44 | | |
| STO: | INFINITY | 4.28 | | |
| 12: | −15.295 | 1 | 1.68893 | 31.2 |
| 13: | 18.25 | 6.91 | 1.618 | 63.4 |
| 14: | −52.268 | 0.1 | | |
| 15: | 29.349 | 6.31 | 1.713 | 53.9 |
| 16: | −41.874 | 0.17 | | |
| 17: | 69.174 | 3.13 | 1.8047 | 40.9 |
| ASP: | ASP: | | | |
| | K: −1.000000 | | | |
| | A: −.146212E−04 B: −.391059E−07 | | | |
| | C: 0.000000E+00 D: 0.000000E+00 | | | |
| 18: | −64.05 | D1 | | |
| ASP: | ASP: | | | |
| | K: −1.000000 | | | |
| | A: 0.171648E−04 B: −.475525E−07 | | | |
| | C: 0.102729E−09 D: −.209766E−13 | | | |
| 19: | 374.129 | 0.9 | 1.90043 | 37.4 |
| 20: | 22.956 | D2 | | |
| 21: | 67.909 | 5.55 | 1.8042 | 46.5 |
| 22: | −38.485 | 0.1 | | |
| 23: | −131.866 | 1.3 | 1.84666 | 23.8 |
| 24: | INFINITY | 0 | | |
| 25: | INFINITY | 19.68 | | |
| 26: | INFINITY | 2 | 1.5168 | 64.2 |
| 27: | INFINITY | 0.52 | | |
| IMG: | INFINITY | | | |

Table 8 below illustrates variable distances in the fourth example embodiment.

TABLE 8

| Variable distances | Infinity | Macro |
|---|---|---|
| D1 | 1.49 | 5.1189 |
| D2 | 7.021 | 3.3921 |

Figure 8:
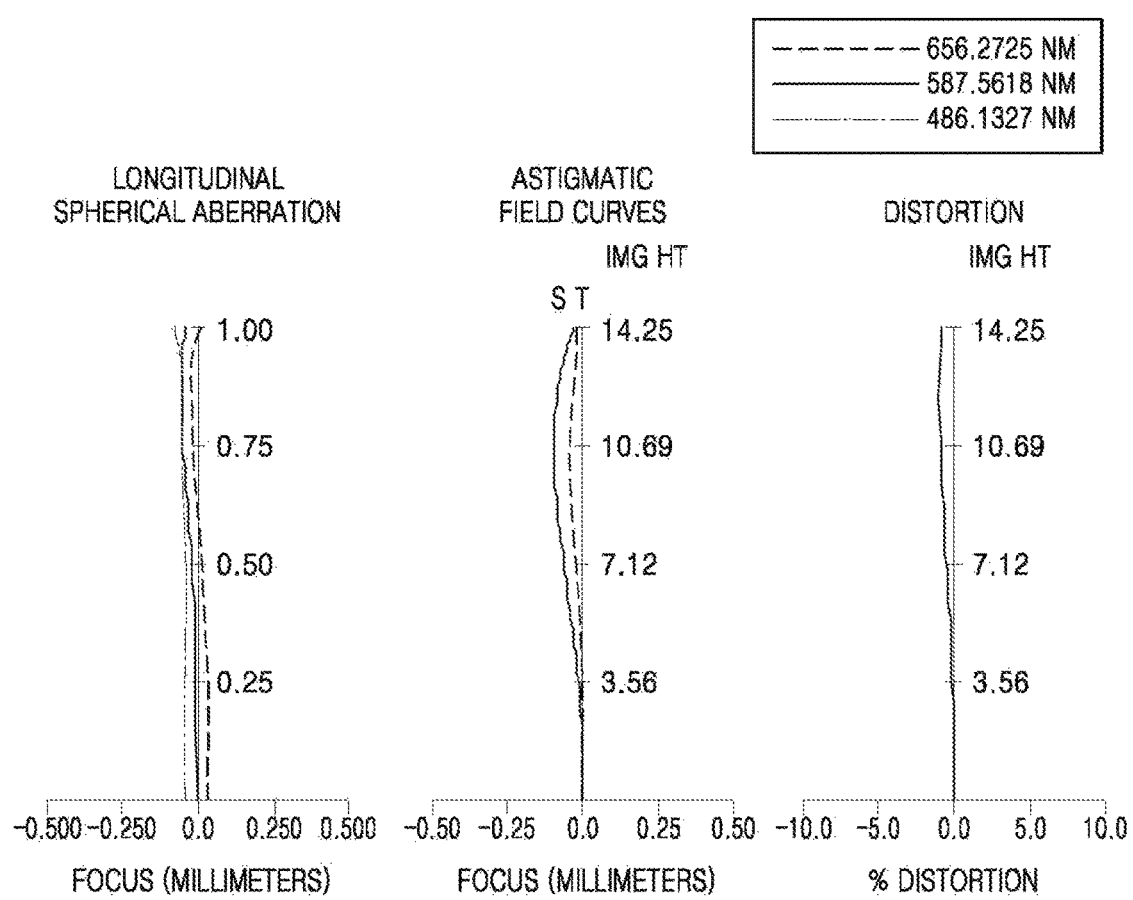
FIG. 8 includes aberration diagrams of the single focus lens illustrated in FIG. 7.

FIG. 8 illustrates longitudinal spherical aberration, astigmatic field curves, and distortion of the single focus lens of the fourth example embodiment when set at infinity focus and macro focus.

Fifth Example Embodiment

FIG. 9 illustrates the single focus lens of the fifth example embodiment, and design data for the single focus lens of the fifth example embodiment is as follows.

f: 24.53 FNO: 1.45 2ω: 60.56

TABLE 9

| Lens surfaces | RDY | THI | Nd | Vd |
|---|---|---|---|---|
| OBJ: | INFINITY | INFINITY | | |
| 1: | INFINITY | 0 | | |
| 2: | 420.746 | 1.4 | 1.58144 | 40.9 |
| 3: | 17.333 | 4.8 | | |
| 4: | 37.604 | 1.8 | 1.49537 | 80.8 |
| 5: | 16.401 | 1.95 | | |
| ASP: | K: −1.000000 | | | |
| | A: −.179094E−04 B: −.543907E−07 | | | |
| | C: 0.114940E−09 D: −.712485E−12 | | | |
| 6: | 25.11 | 4.85 | 1.883 | 40.8 |
| 7: | −422.777 | 0 | | |
| 8: | 65.299 | 0.1 | | |
| 9: | 22.296 | 2.31 | 2.001 | 29.1 |
| 10: | 28.414 | 9.1 | | |
| STO: | INFINITY | 4.42 | | |
| 12: | −14.676 | 1 | 1.68893 | 31.2 |
| 13: | 19.273 | 7.09 | 1.6178 | 63.4 |
| 14: | −42.561 | 0.1 | | |
| 15: | 30.731 | 6.27 | 1.713 | 53.9 |
| 16: | −42.742 | 0.34 | | |
| 17: | 76.459 | 3.23 | 1.8047 | 40.9 |
| ASP: | ASP: | | | |
| | K: −1.000000 | | | |
| | A: −.144903E−04 B: −.245177E−07 | | | |
| | C: 0.000000E+00 D: 0.000000E+00 | | | |
| 18: | −57.001 | D1 | | |
| ASP: | ASP: | | | |
| | K: −1.000000 | | | |
| | A: 0.158126E−04 B: −.344331E−07 | | | |
| | C: 0.852314E−10 D: −.363690E−13 | | | |
| 19: | 256.186 | 0.9 | 1.90043 | 37.4 |
| 20: | 23.017 | D2 | | |
| 21: | 73.773 | 5.35 | 1.8042 | 46.5 |
| 22: | −38.993 | 0.1 | | |
| 23: | −120.561 | 1.3 | 1.84666 | 23.8 |
| 24: | −51848.656 | 0 | | |
| 25: | INFINITY | 19.68 | | |
| 26: | INFINITY | 2 | 1.5168 | 64.2 |
| 27: | INFINITY | 0.52 | | |
| IMG: | INFINITY | | | |

Table 10 below illustrates variable distances in the fifth example embodiment.

TABLE 10

| Variable distances | Infinity | Macro |
|---|---|---|
| D1 | 1.49 | 5.0599 |
| D2 | 7.096 | 3.5261 |

Figure 10:
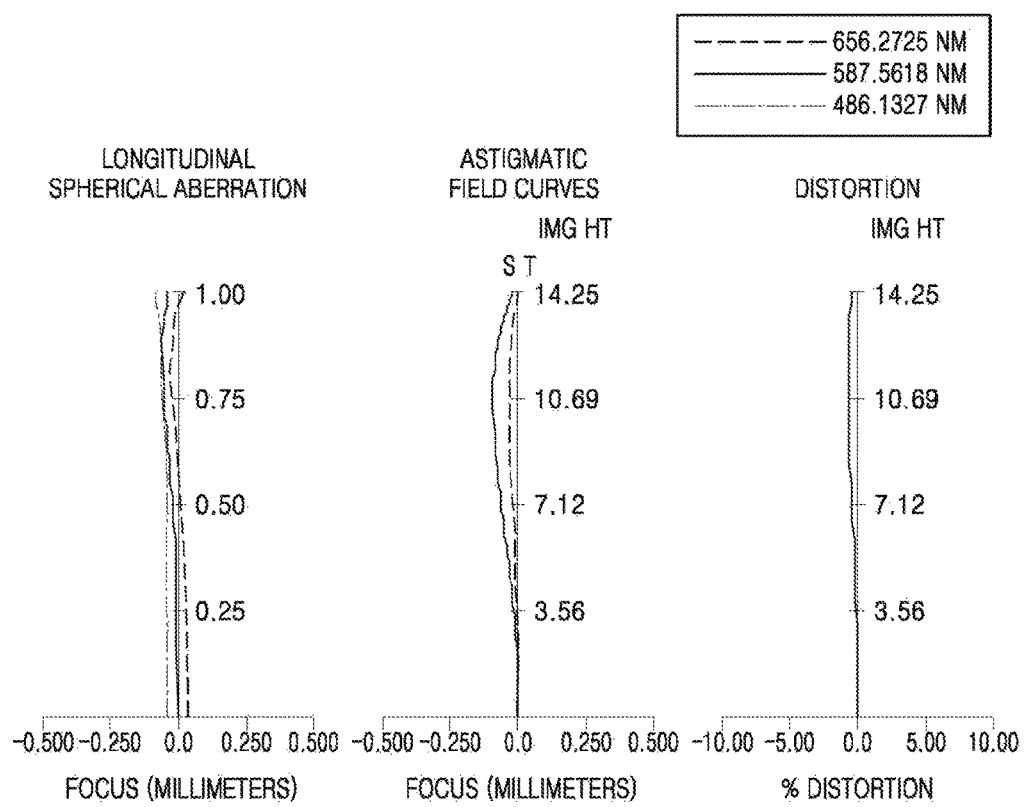
FIG. 10 includes aberration diagrams of the single focus lens illustrated in FIG. 9.

FIG. 10 illustrates longitudinal spherical aberration, astigmatic field curves, and distortion of the single focus lens of the fifth example embodiment when set at infinity focus and macro focus.

Sixth Example Embodiment

FIG. 11 illustrates the single focus lens of the sixth example embodiment, and design data for the single focus lens of the sixth example embodiment is as follows.

f: 24.52 FNO: 1.53 2ω: 59.86

TABLE 11

| Lens surfaces | RDY | THI | Nd | Vd |
|---|---|---|---|---|
| OBJ: | INFINITY | INFINITY | | |
| 1: | 75.102 | 1.4 | 1.62004 | 36.3 |
| 2: | 17.484 | 7.03 | | |
| 3: | 157.525 | 1.8 | 1.49537 | 80.8 |
| 4: | 19.349 | 1.92 | | |
| ASP: | ASP: | | | |
| | K: −1.000000 | | | |
| | A: −.163313E−04 B: −.378045E−07 | | | |
| | C: 0.913184E−10 D: −.462672E−12 | | | |
| 5: | 28.378 | 4.95 | 1.83481 | 42.7 |
| 6: | −22623.614 | 0.76 | | |
| 7: | 28.007 | 3.06 | 1.95375 | 32.3 |
| 8: | 61.031 | 9.18 | | |
| STO: | INFINITY | 5.22 | | |
| 10: | −16.376 | 1 | 1.68893 | 31.2 |
| 11: | 20.525 | 8.26 | 1.618 | 63.4 |
| 12: | −40.563 | 0.28 | | |
| 13: | 29.744 | 7.2 | 1.713 | 53.9 |
| 14: | −48.687 | 0.16 | | |
| 15: | 67.104 | 3.01 | 1.8047 | 40.9 |
| ASP: | ASP: | | | |
| | K: −1.000000 | | | |
| | A: −.139121E−04 B: −.312782E−07 | | | |
| | C: 0.000000E+00 D: 0.000000E+00 | | | |
| 16: | −92.617 | D1 | | |
| ASP: | ASP: | | | |
| | K: −1.000000 | | | |
| | A: 0.126060E−04 B: −.376469E−07 | | | |
| | C: 0.841338E−10 D: −.672952E−13 | | | |
| 17: | 103.946 | 0.9 | 1.90043 | 37.8 |
| 18: | 22.117 | D2 | | |
| 19: | 107.3 | 4.03 | 1.8042 | 46.5 |
| 20: | −41.6 | 0.15 | | |
| 21: | −102.311 | 1.3 | 1.84666 | 23.8 |
| 22: | 975080.162 | 19.68 | | |
| 23: | INFINITY | 2 | 1.5168 | 64.2 |
| 24: | INFINITY | 0.52 | | |
| IMG: | INFINITY | | | |

Table 12 below illustrates variable distances in the sixth example embodiment.

TABLE 12

| Variable distances | Infinity | Macro |
|---|---|---|
| D1 | 1.49 | 4.8973 |
| D2 | 7.3867 | 3.9794 |

Figure 12:
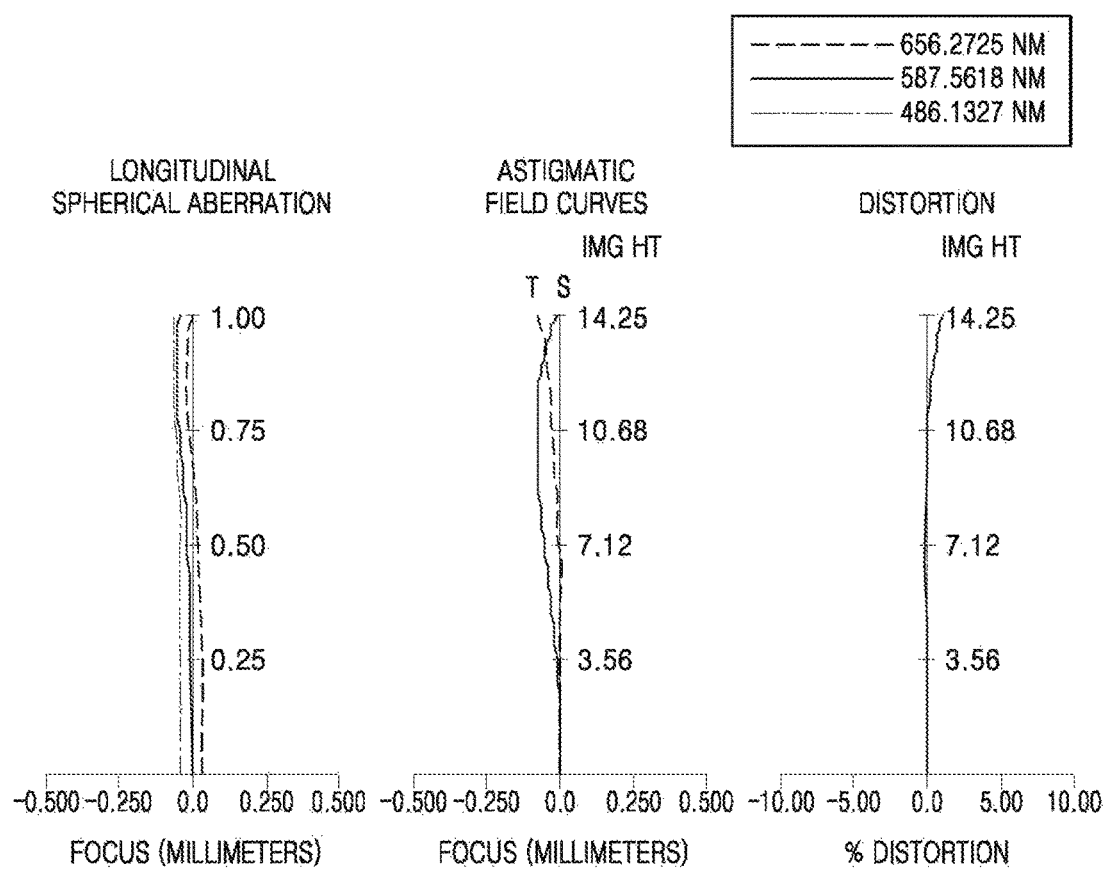
FIG. 12 includes aberration diagrams of the single focus lens illustrated in FIG. 11.

FIG. 12 illustrates longitudinal spherical aberration, astigmatic field curves, and distortion of the single focus lens of the sixth example embodiment when set at infinity focus and macro focus.

Seventh Example Embodiment

FIG. 13 illustrates the single focus lens of the seventh example embodiment, and design data for the single focus lens of the seventh example embodiment is as follows.

f: 24.52 FNO: 1.45 2ω: 59.88

TABLE 13

| Lens surfaces | RDY | THI | Nd | Vd |
|---|---|---|---|---|
| OBJ: | INFINITY | INFINITY | | |
| 1: | 54.87 | 1.4 | 1.6727 | 32.2 |
| 2: | 17.148 | 7.15 | | |
| 3: | 325.307 | 1.8 | 1.49537 | 80.8 |
| ASP: | K: −1.000000 | | | |
| | A: 0.250728E−05 B: −.623946E−08 | | | |
| | C: −.684929E−10 D: −.160886E−12 | | | |

TABLE 13-continued

| Lens surfaces | RDY | THI | Nd | Vd |
|---|---|---|---|---|
| 4: | 23.145 | 1.03 | | |
| ASP: | K: −1.000000 | | | |
| | A: −.157756E−04 B: −.361088E−07 | | | |
| | C: −.143478E−09 D: −.688175E−13 | | | |
| 5: | 30.733 | 5 | 1.91082 | 35.3 |
| 6: | −488.78 | 2.61 | | |
| 7: | 25.931 | 3.45 | 1.91082 | 35.3 |
| 8: | 102.15 | 2.37 | | |
| 9: | 243.756 | 1.2 | 1.60342 | 38 |
| 10: | 29.296 | 3.48 | | |
| STO: | INFINITY | 5.42 | | |
| 12: | −14.599 | 1 | 1.6727 | 32.2 |
| 13: | 33.459 | 6.73 | 1.618 | 63.4 |
| 14: | −31.344 | 0.15 | | |
| 15: | 27.555 | 8.08 | 1.497 | 81.6 |
| 16: | −44.302 | 0.15 | | |
| 17: | 44.139 | 4.14 | 1.8047 | 40.9 |
| ASP: | ASP: | | | |
| | K: −1.000000 | | | |
| | A: −.883640E−05 B: −.210392E−08 | | | |
| | C: 0.000000E+00 D: 0.000000E+00 | | | |
| 18: | −64.729 | 1.49 | | |
| ASP: | ASP: | | | |
| | K: −1.000000 | | | |
| | A: 0.152438E−04 B: −.897817E−08 | | | |
| | C: 0.495483E−10 D: 0.679150E−13 | | | |
| 19: | 77.379 | 0.9 | 1.91082 | 35.3 |
| 20: | 22.824 | 7.72 | | |
| 21: | 103.923 | 3.79 | 1.8042 | 46.5 |
| 22: | −48.574 | 0.15 | | |
| 23: | −103.853 | 1.3 | 1.84666 | 23.8 |
| 24: | 457345.2 | 0 | | |
| 25: | INFINITY | 19.68 | | |
| 26: | INFINITY | 2 | 1.5168 | 64.2 |
| 27: | INFINITY | 0.52 | | |
| IMG: | INFINITY | | | |

Table 14 below illustrates variable distances in the seventh example embodiment.

TABLE 14

| Variable distances | Infinity | Macro |
|---|---|---|
| D1 | 1.49 | 4.8973 |
| D2 | 7.3867 | 3.9794 |

Figure 14:
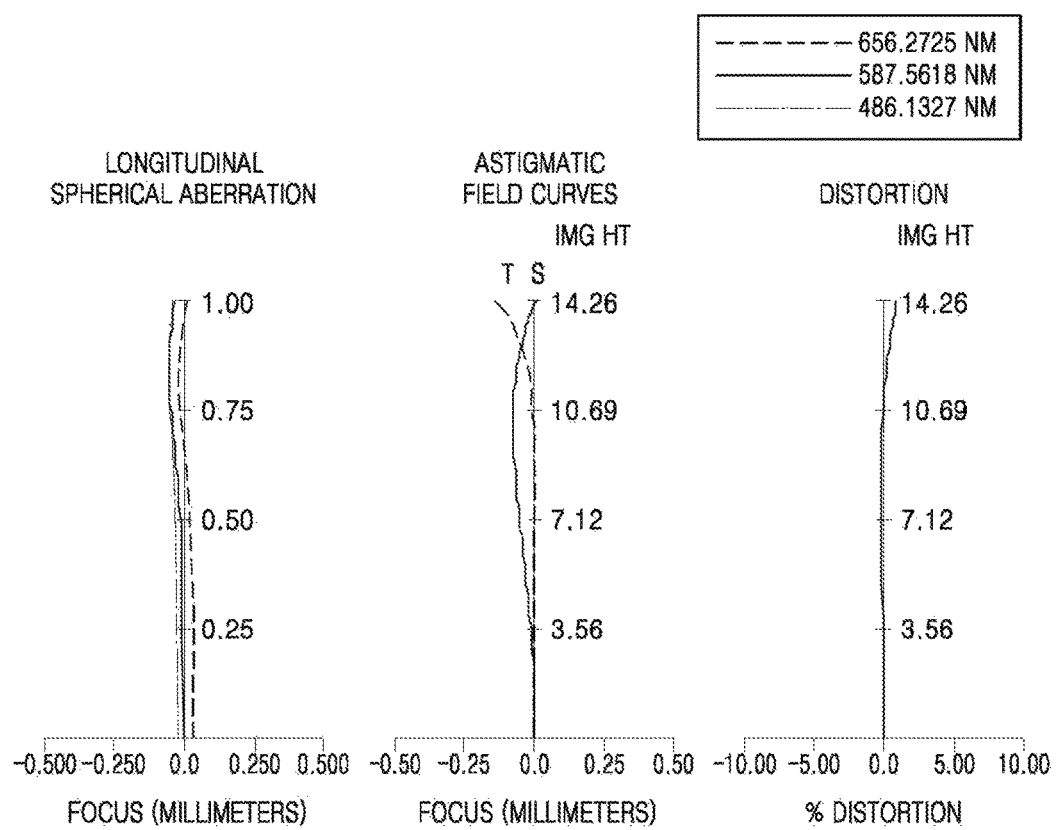
FIG. 14 includes aberration diagrams of the single focus lens illustrated in FIG. 13.

FIG. 14 illustrates longitudinal spherical aberration, astigmatic field curves, and distortion of the single focus lens of the seventh example embodiment when set at infinity focus and macro focus.

Table 15 illustrates that the single focus lenses of the first to seventh example embodiments satisfy Expressions 1 to 6.

TABLE 15

| | First example embodiment | Second example embodiment | Third example embodiment | Fourth example embodiment | Fifth example embodiment | Sixth example embodiment | Seventh example embodiment |
|---|---|---|---|---|---|---|---|
| Expression 1 | 0.721 | 0.725 | 0.85 | 0.722 | 0.7124 | 0.680 | 0.700 |
| Expression 2 | 1.953 | 1.953 | 1.918 | 1.900 | 1.900 | 1.900 | 1.910 |
| Expression 3 | −1.372 | −1.376 | −1.100 | −1.108 | −1.147 | −1.279 | −1.461 |
| Expression 4 | −28.087 | −25.472 | −80.851 | −88.308 | −18.442 | −19.741 | −38.893 |
| Expression 5 | −0.984 | −0.993 | 0.616 | −0.813 | −0.875 | −1.07335 | −1.031 |
| Expression 6 | −2.343 | −2.282 | −4.98 | −4.404 | −3.202 | −2.946 | −16.568 |

The single focus lenses of the various example embodiments may be applied to small photographing apparatuses and may perform handshaking compensation and focusing to obtain high-quality images and videos. Furthermore, according to the example embodiments, a small, lightweight handshaking compensation lens group and a small, lightweight focusing lens group may be provided to make it possible to manufacture a small photographing apparatus. In addition, since a small, lightweight focusing lens group is provided, rapid auto-focusing may be possible. The single focus lenses of the embodiments may be applied to photographing apparatuses including image sensors. The single focus lenses of the embodiments may be applied to various photographing apparatuses such as digital cameras, interchangeable lens cameras, video cameras, cellular phone cameras, mirrorless cameras, or cameras for small mobile devices.

Figure 15:
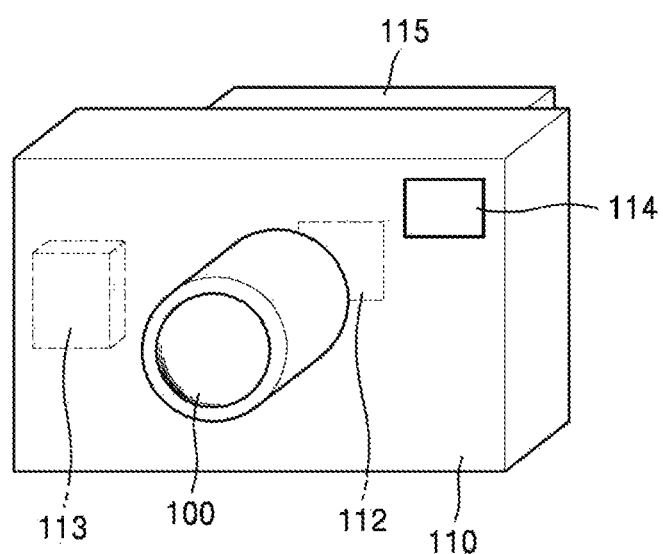
FIG. 15 is a diagram illustrating an example photographing apparatus according to an example embodiment.

FIG. 15 is a diagram illustrating an example photographing apparatus 110 including a single focus lens 100 according to an example embodiment. The photographing apparatus 110 may include the single focus lens 100 and an image sensor 112. The image sensor 112 may receive optical images formed by the single focus lens 100 and may convert the optical images into electrical image signals. The single focus lens 100 may be any one of the single focus lenses 100-1, 100-2, 100-3, 100-4, 100-5, 100-6, and 100-7 described with reference to FIGS. 1 to 14. The photographing apparatus 110 may include a recording medium 113 and a viewfinder 114. Information about objects may be photoelectrically converted by the image sensor 112 and recorded in the recording medium 113. The viewfinder 114 may be used to view an object to be photographed. The photographing apparatus 110 may include a display unit (e.g., including a display) 115 to display object images. In the example embodiment, both the viewfinder 114 and the display unit 115 are provided. In other example embodiments, however, only the display unit 115 may be provided. The photographing apparatus 110 illustrated in FIG. 15 is an example, and the disclosure is not limited thereto.

Figure 16:
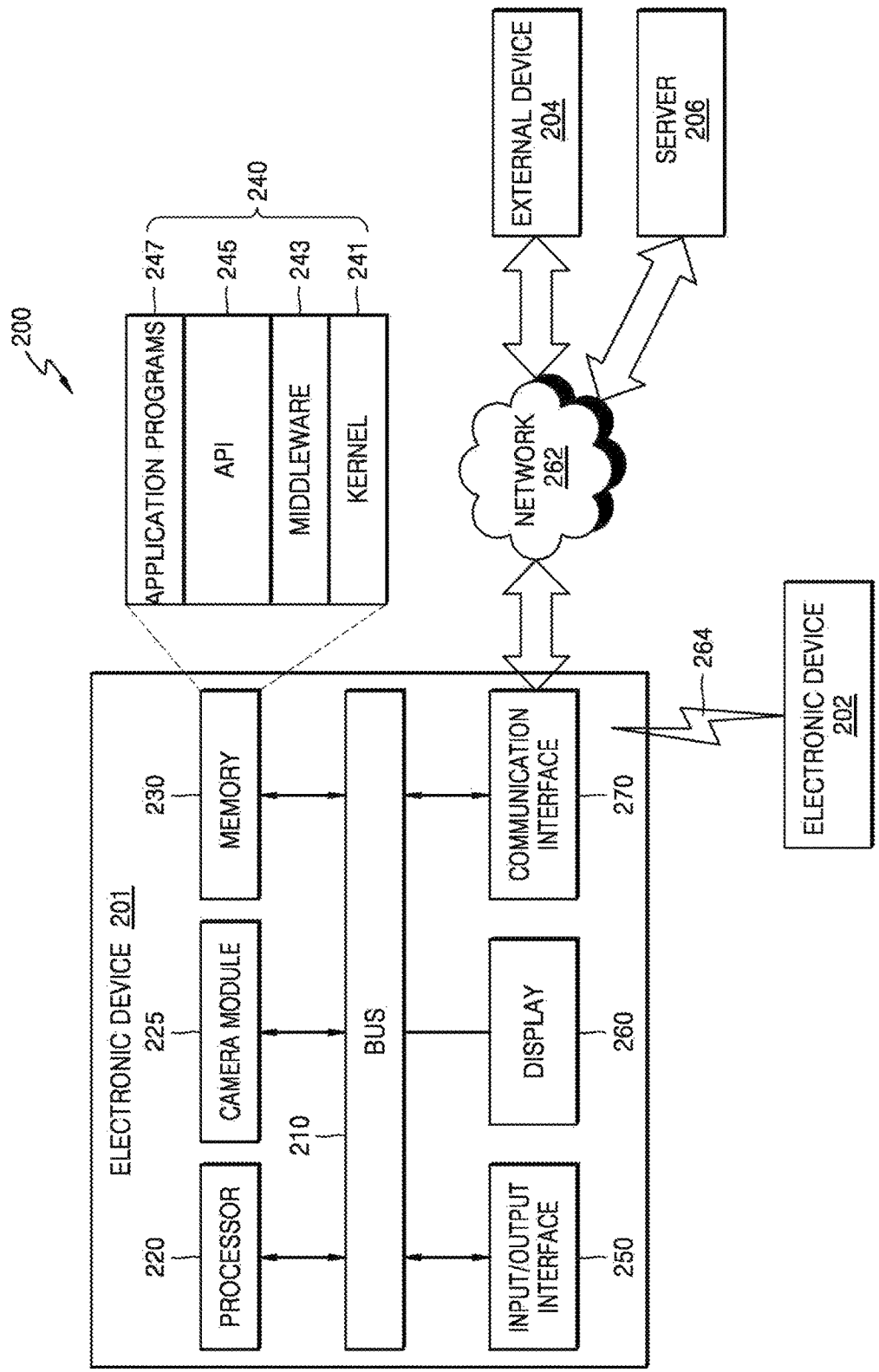
FIG. 16 is a diagram illustrating an example network environment according to an example embodiment.

FIG. 16 illustrates an example electronic device 201 in a network environment 200 according to an example embodiment. The electronic device 201 may include a bus 210, a processor 220, a camera module (e.g., including imaging circuitry) 225, a memory 230, an input/output interface (e.g., including input/output circuitry) 250, a display 260, and a communication interface (e.g., including communication circuitry) 270. In some embodiments, at least one of the elements of the electronic device 201 may be omitted, or the electronic device 201 may include another element.

For example, the bus 210 may include a circuit configured to connect the elements for communication (for example, transmission of control messages and/or data) therebetween.

The processor 220 may include one or more of a central processing unit (CPU), an application processor (AP), and a communication processor (CP). For example, the processor 220 may perform calculation or data processing which relates to control and/or communication of at least one of the other elements of the electronic device 201.

For example, the camera module 225 may include various circuitry configured to take still images and videos. According to the embodiment, the camera module 225 may include various imaging circuitry, such as, for example, and without limitation, at least one image sensor (for example, a front image sensor or a rear image sensor), a lens, an image signal processor (ISP), or a flash (for example, a light emitting diode (LED) or a xenon lamp). For example, the camera module 225 may include any one of the single focus lenses of the previous embodiments.

The memory 230 may include a volatile memory and/or a nonvolatile memory. For example, the memory 230 may store instructions or data relating to at least one of the other elements of the electronic device 201. According to the embodiment, the memory 230 may include software and/or a program 240. For example, the program 240 may include a kernel 241, middleware 243, an application programming interface (API) 245, and/or application programs (or applications) 247. At least a part of the kernel 241, the middleware 243, or the API 245 may function as an operating system (OS).

For example, the kernel 241 may control or manage system resources (such as the bus 210, the processor 220, or the memory 230) used to execute operations or functions of the other programs (such as the middleware 243, the API 245, or the application programs 247). In addition, the kernel 241 may provide an interface allowing the middleware 243, the API 245, or the application programs 247 to access individual elements of the electronic device 201, thereby making it possible to control or manage system resources.

For example, the middleware 243 may function as intermediary so that the API 245 or the application programs 247 may communicate with the kernel 241 for transmission of data therebetween.

In addition, the middleware 243 may process one or more operation requests from the application programs 247 in the order of priority. For example, the middleware 243 may give priority to at least one of the application programs 247 such that the at least one of the application programs 247 may use system resources (such as the bus 210, the processor 220, or the memory 230) of the electronic device 201. For example, the middleware 243 may process the one or more operation requests from the application programs 247 according to the priority given to at least one of the application programs 247. In this manner, the middleware 243 may perform a scheduling or load-balancing operation relating to the one or more operation requests.

For example, the API 245 is an interface through which the application programs 247 control functions provided by the kernel 241 or the middleware 243. For example, the API 245 may include at least one interface or function (for example, a command) for file control, window control, image processing, or text control.

For example, the input/output interface 250 may include various input/output interface circuitry provided to function as an interface for transmitting instructions or data input from a user or another external device to one or more of the other elements of the electronic device 201. In addition, the input/output interface 250 may transmit instructions or data received from one or more of the other elements of the electronic device 201 to a user or another external device.

For example, the display 260 may include a liquid crystal display (LCD), an LED display, an organic light emitting diode (OLED) display, a microelectromechanical system (MEMS) display, or an electronic paper display, or the like, but is not limited thereto. For example, the display 260 may display contents (such as texts, images, videos, icons, or symbols) for users. The display 260 may include a touch screen. For example, the display 260 may receive an input through a touch, a gesture, an approaching action, or a hovering action by an electronic pen or a user's body part.

For example, the communication interface 270 may include various communication circuitry provided to enable communication between the electronic device 201 and an external device (for example, a first external electronic device 202, a second external electronic device 204, or a server 206). For example, the communication interface 270 may communicate with external devices (for example, the second external electronic device 204 or the server 206) connected to a network 262 by a wireless communication method or a wired communication method.

For example, the wireless communication method may use a cellular protocol. For example, the wireless communication method may use at least one of long-term evolution (LTE), LTE advance (LTE-A), code division multiple access (CDMA), wideband CDMA (WCDMA), universal mobile telecommunications system (UMTS), wireless broadband (WiBro), or global system for mobile communications (GSM). In addition, the wireless communication method may include short-range communication 264. For example, the short-range communication 264 may include at least one of wireless fidelity (WiFi), Bluetooth, near field communication (NFC), or global navigation satellite system (GNSS). For example, according to regions or bandwidths, GNSS may include at least one of global positioning system (GPS), global navigation satellite system (Glonass), Beidou navigation satellite system (hereinafter referred to as Beidou), or the European global satellite-based navigation system (Galileo). In the present disclosure, "GPS" and "GNSS" may be interchangeably used. For example, the wired communication method may use at least one of universal serial bus (USB), high definition multimedia interface (HDMI), recommended standard-232 (RS-232), or plain old telephone service (POTS). For example, the network 262 may include at least one of a telecommunications network, a computer network (such as a local area network (LAN) or a wide area network (WAN)), the Internet, or a telephone network.

Each of the first external electronic device 202 and the second external electronic device 204 may be the same as or different from the electronic device 201. According to an embodiment, the server 206 may include a group of one or more servers. According to an embodiment, all or some of operations of the electronic device 201 may be performed in one or more other electronic devices (such as the first and second external electronic devices 202 and 204) or the server 206. According to an embodiment, when the electronic device 201 has to perform a function or service by request or automation, instead of or in addition to performing the function or service by itself, the electronic device 201 may request the server 206 or other devices (such as the first external electronic device 202 or the second external electronic device 204) to perform at least a part of the function or service. The server 206 or other devices (such as the first external electronic device 202 or the second external electronic device 204) may perform the at least part of the function or service in response to the request and may send results thereof to the electronic device 201. The electronic device 201 may intactly use the received results or may process the received results so as to implement the function or service. To this end, for example, cloud computing, distributed computing, or client-server computing technology may be used.

Figure 17:
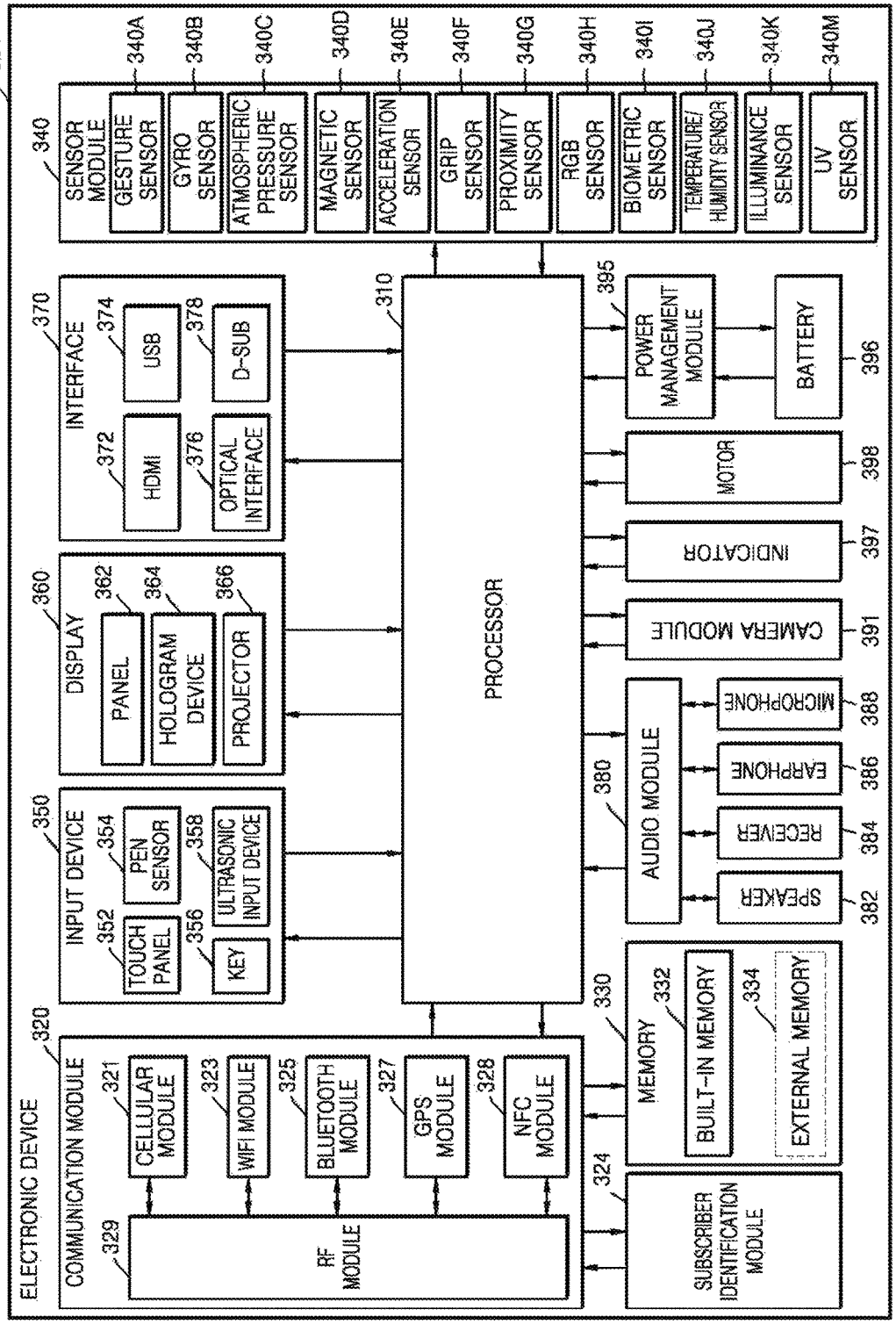
FIG. 17 is a block diagram illustrating an example electronic device according to an example embodiment.

FIG. 17 is a block diagram illustrating an example electronic device 301 according to an example embodiment. The electronic device 301 may entirely or partially include the electronic device 201 illustrated in FIG. 16. The electronic device 301 may include at least one processor 310 (such as an AP), a communication module (e.g., including communication circuitry) 320, a subscriber identification module 324, a memory 330, a sensor module 340, an input unit (e.g., including input circuitry) 350, a display 360, an interface (e.g., including interface circuitry) 370, an audio module 280, a camera module 391, a power management module 395, a battery 396, an indicator 397, and a motor 398.

For example, the processor 310 may control many pieces of hardware or software connected to the processor 310 by executing an operating system or an application program, and may perform data processing and calculation. For example, the processor 310 may be implemented as a system on chip (SoC). According to an embodiment, the processor 310 may include a graphic processing unit (GPU) and/or image signal processor. The processor 310 may include at least one elements illustrated in FIG. 17 (for example, a cellular module 321). The processor 310 may load instructions or data transmitted from at least one of the other elements (such as a nonvolatile memory) on a volatile memory and may process the instructions or data, and may store various data on the nonvolatile memory.

The structure of the communication module 320 may be the same as or similar to the structure of the communication interface 270 illustrated in FIG. 16. For example, the communication module 320 may include various communication circuitry, such as, for example, and without limitation, the cellular module 321, a WiFi module 323, a Bluetooth module 325, a GNSS module 327 (such as a GPS module, a Glonass module, a Beidou module, or a Galileo module), an NFC module 328, and a radio frequency (RF) module 329.

For example, the cellular module 321 may provide services such as voice calling, video calling, text messaging, or Internet connection by using a communication network. According to an embodiment, the cellular module 321 may identify and authenticate the electronic device 301 in a communication network by using the subscriber identification module 324 (for example, a subscriber identification module (SIM) card). According to an embodiment, the cellular module 321 may perform at least one of functions that the processor 310 may provide. According to an embodiment, the cellular module 321 may include a communication processor (CP).

For example, each of the WiFi module 323, the Bluetooth module 325, the GNSS module 327, and the NFC module 328 may include a processor to process received data or data to be transmitted. In some embodiments, at least one of (for example, two of) the cellular module 321, the WiFi module 323, the Bluetooth module 325, the GNSS module 327, or the NFC module 328 may be included in an integrated chip (IC) or an IC package.

For example, the RF module 329 may transmit and receive communication signals (for example, RF signals). For example, the RF module 329 may include a transceiver, a power amp module (PAM), a frequency filter, a low noise amplifier (LNA), or an antenna. In other embodiments, at least one of the cellular module 321, the WiFi module 323, the Bluetooth module 325, the GNSS module 327, or the NFC module 328 may transmit and receive RF signals using a separate RF module.

For example, the subscriber identifier module 324 may include an SIM card or an embedded SIM. The subscriber identification module 324 may include unique identification information (such as an integrated circuit card identifier (ICCID)) or subscriber information (such as an international mobile subscriber identity (IMSI)).

For example, the memory 330 may include a built-in memory 332 or an external memory 334. For example, the built-in memory 332 may include at least one of a volatile memory such as a dynamic random access memory (DRAM), a static random access memory (SRAM), or a synchronous dynamic random access memory (SDRAM); or a nonvolatile memory such as a one time programmable read only memory (OTPROM), a programmable read only memory (PROM), an erasable and programmable read only memory (EPROM), an electrically erasable and programmable read only memory (EEPROM), a mask read only memory (ROM), a flash ROM, a flash memory (for example, a NAND flash memory or a NOR flash memory), a hard disk drive, or a solid state drive (SSD).

The external memory 334 may include a flash drive and may further include, for example, a compact flash (CD) card, a secure digital (SD) card, a micro secure digital (Micro-SD) card, a mini secure digital (Mini-SD) card, an extreme digital (xD) card, a multi-media card (MMC), or a memory stick. The external memory 334 may be operatively and/or physically connected to the electronic device 301 through various interfaces.

For example, the sensor module 340 may measure physical quantities or detect operational states of the electronic device 301, and may convert measured or detected information into electrical signals. For example, the sensor module 340 may include at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (such as a red-green-blue (RGB) sensor), a biometric sensor 340I, a temperature/humidity sensor 340J, an illuminance (e.g., light) sensor 340K, or an ultraviolet (UV) sensor 340M. Additionally or alternatively, the sensor module 340 may, for example, include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit configured to control at least one sensor of the sensor module 340. In some embodiments, the electronic device 301 may further include a processor as a part of or independently of the processor 310 so as to control the sensor module 340. When the processor 310 is in a sleep mode, the processor may control the sensor module 340.

For example, the input unit 350 may include various input circuitry, such as, for example, and without limitation, a touch panel 352, a (digital) pen sensor 354, a key 356, or an ultrasonic input unit 358. For example, the touch panel 352 may use at least one of a capacitive method, a resistive method, an infrared method, or an ultrasonic method. In addition, the touch panel 352 may further include a control circuit. The touch panel 352 may further include a tactile layer to provide a tactile sense to a user.

For example, the (digital) pen sensor 354 may be a part of the touch panel 352 or may include a separate sensing sheet. For example, the key 356 may include a physical button, an optical key, or a keypad. The ultrasonic input unit 358 may detect ultrasonic waves generated from an input tool by using a microphone (such as a microphone 388) and may check data corresponding to the ultrasonic waves.

The display 360 may include a panel 362, a hologram device 364, or a projector 366. The structure of the panel 362 may be the same as or similar to the structure of the display 260 illustrated in FIG. 16. For example, the panel 362 may be flexible, transparent, or wearable. The panel 362 and the touch panel 352 may be provided as a single module. The hologram device 364 may display three-dimensional images in a space by using interference of light. The projector 366 may display images by projecting light onto a screen. For example, the screen may be located inside or outside the electronic device 301. According to an embodiment, the display 360 may further include a control circuit to control the panel 362, the hologram device 364, or the projector 366.

For example, the interface 370 may include various interface circuitry, such as, for example, and without limitation, an HDMI 372, a USB 374, an optical interface 376, or a D-subminiature (D-sub) 378. For example, the interface 370 may include the communication interface 270 illustrated in FIG. 16. Additionally or alternatively, the interface 370 may, for example, include a mobile high-definition link (MHL) interface, a SD card/MMC interface, or an infrared data association (IrDA) interface.

For example, the audio module 280 may convert sounds into electric signals, and electric signals into sounds. For example, at least one element of the audio module 280 may include the input/output interface 250 illustrated in FIG. 16. For example, the audio module 280 may process sound information that is input through or will be output through a speaker 382, a receiver 384, an earphone 386, or the microphone 388.

For example, the camera module 391 may take still images and videos. According to an embodiment, the camera module 391 may include at least one image sensor (for example, a front image sensor or a rear image sensor), a lens, an ISP, or a flash (for example, an LED or a xenon lamp). For example, the camera module 391 may include any one of the single focus lenses of the previous embodiments.

For example, the power management module 395 may manage power of the electronic device 301. The electronic device 301 may receive power from the battery 396. However, the electronic device 301 is not limited to receiving power from the battery 396. According to an embodiment, the power management module 395 may include a power management integrated circuit (PMIC), a charger integrated circuit (IC), or a battery or fuel gauge. The PMIC may use a wired and/or wireless charging method. For example, the wireless charging method may include a magnetic resonance method, a magnetic induction method, or an electromagnetic wave method, and an additional wireless charging circuit such as a coil loop, a resonance circuit, or a rectifier may be used. For example, the battery or fuel gauge may measure the amount of electricity remaining in the battery 396 and the voltage, current, or temperature of the battery 396 during a charging operation. For example, the battery 396 may include a rechargeable battery and/or a solar battery.

The indicator 397 may display a particular state such as a booting state, a messaging state, or a charge state of the electronic device 301 or a part of the electronic device 301 (such as the processor 310). The motor 398 may convert an electric signal into a mechanical vibration and may produce a vibrational or haptic effect. The electronic device 301 may include a processing device (such as a GPU) to support a mobile TV service. The processing unit for a mobile TV service may process media data according to a standard such as digital multimedia broadcasting (DMB), digital video broadcasting (DVB), or mediaFlo™.

In the present disclosure, each of the above-described elements may be configured with one or more components, and the names of the elements may vary based on the type of the electronic device. According to various embodiments, the electronic device may include at least one of the aforementioned elements. Some elements may be omitted or other additional elements may be further included in the electronic device. Furthermore, in some embodiments, some elements of the electronic device may be combined as one entity, which may have the same functions as those of the elements.

The term "module" used in this disclosure may refer to a unit including, for example, one of hardware (e.g., circuitry), software, firmware or any combination thereof. For example, the term "module" may be interchangeable with a term such as unit, logic, logical block, component, or circuit. A module may be a minimum unit or a part of an integral component. A module may be a minimum unit or a part of the minimum unit, which performs one or more particular functions. A module may be formed mechanically or electronically. For example, a module may include at least one of processing circuitry, application-specific integrated circuit (ASIC) chip, field-programmable gate arrays (FPGAs), or a programmable-logic device which have been known or are to be developed.

According to an example embodiment, at least a portion of an apparatus (e.g., modules or functions thereof) or a method (e.g., operations), for example, may be implemented as instructions stored in a computer-readable storage medium in the form of a programmable module. When the instructions are executed by one or more processors (e.g., the processor 220 illustrated in FIG. 16), the one or more processors may perform functions corresponding to the instructions. The computer-readable storage medium, for example, may be the memory 230.

A computer-readable recording medium may include a hard disk, a floppy disk, a magnetic medium (e.g., a magnetic tape), an optical medium (e.g., a compact disc read only memory (CD-ROM) or a digital versatile disc (DVD)), a magneto-optical media (e.g., a floptical disk), or a hardware device (e.g., a read only memory (ROM), a random access memory (RAM), or a flash memory). Also, a program instruction may include not only a machine language code such as those generated by a compiler but also a high-level language code executable on a computer using an interpreter, etc. The above-mentioned hardware device may be configured to operate via one or more software modules to perform operations according to embodiments, and vice versa. A module or a programming module according to an embodiment may include at least one of the above-described elements, or a portion of the above-described elements may be omitted, or additional other elements may be further included. Operations performed by a module, a programming module, or other elements according to an embodiment of the present disclosure may be executed sequentially, in parallel, repeatedly, or in a heuristic method. Also, some operations may be executed in different sequences or may be omitted, or other operations may be added. It should be understood that embodiments described herein should be considered in a descriptive sense only and not for purposes of limitation. Descriptions of features or aspects within each embodiment should typically be considered as available for other similar features or aspects in other embodiments. While one or more example embodiments have been described with reference to the figures, it will be understood by those of ordinary skill in the art that various changes in form and details may be made therein without departing from the spirit and scope as defined by the following claims.

What is claimed is:

1. A single focus lens comprising:
   a first lens group having a positive refractive power, the first lens group comprising a first negative lens and a second negative lens arranged in succession, without another intervening lens, at a most object side of the first lens group;
   a second lens group having a negative refractive power and comprising a focusing lens configured to perform a focusing operation; and
   a third lens group having a positive refractive power and comprising a positive lens and a negative lens,
   wherein the first lens group, the second lens group, and the third lens group are sequentially arranged in a direction from an object side to an image side, and
   wherein the first negative lens is a meniscus lens having a convex object side and the second negative lens is a meniscus lens having a convex object side wherein the first lens group further comprises an aperture stop.

2. The single focus lens of claim 1, wherein the single focus lens satisfies the following expression:

$$0.4 \leq f1/f \leq 1.3$$

where f1 denotes a focal length of the first lens group, and f denotes a total focal length of the single focus lens.

3. The single focus lens of claim 1, wherein a doublet lens comprising a negative lens concave disposed toward the object side and a biconvex lens cemented together is arranged at an image side of the aperture stop.

4. The single focus lens of claim 1, wherein the single focus lens comprises at least one aspherical lens arranged at an object side of the aperture stop and at least one aspherical lens arranged at an image side of the aperture stop.

5. The single focus lens of claim 1, wherein the single focus lens satisfies the following expression:

$$1.85 \leq N2 \leq 2.1$$

where N2 denotes a refractive index of the focusing lens of the second lens group at a d-line wavelength.

6. The single focus lens of claim 1, wherein the focusing lens of the second lens group comprises a meniscus lens convex toward the object side.

7. The single focus lens of claim 1, wherein the single focus lens satisfies the following expression:

$$-2.0 \leq f2/f \leq -0.7$$

where f2 denotes a focal length of the focusing lens of the second lens group, and f denotes a total focal length of the single focus lens.

8. The single focus lens of claim 1, wherein the single focus lens satisfies the following expression:

$$-100 \leq f1a \leq -10$$

where f1a denotes a combined focal length of the first negative lens and the second negative lens of the first lens group.

9. The single focus lens of claim 1, wherein the first lens group further comprises a first positive lens and a second positive lens arranged at an image side of the second negative lens.

10. The single focus lens of claim 9, wherein the single focus lens satisfies the following expression:

$$-2 \leq f1a/f1b \leq -0.5$$

where f1a denotes a combined focal length of the first and second negative lenses of the first lens group, and f1b denotes a combined focal length of the first and second positive lenses of the first lens group.

11. The single focus lens of claim 1, wherein the third lens group comprises a first positive lens and a first negative lens.

12. The single focus lens of claim 11, wherein the single focus lens satisfies the following expression:

$$-20 \leq f3b/f3a \leq -1$$

where f3a denotes a focal length of the first positive lens of the third lens group, and f3b denotes a focal length of the first negative lens of the third lens group.

13. The single focus lens of claim 1, wherein the single focus lens has a field of view within a range of about 55° to about 180°.

14. The single focus lens of claim 1, wherein the single focus lens has an F-number of about 1.8 or less.

15. A single focus lens, comprising:
    a first lens group having a positive refractive power, the first lens group comprising a first negative lens and a second negative lens arranged in succession, without another intervening lens, at a most object side of the first lens group;
    a second lens group having a negative refractive power and comprising a focusing lens configured to perform a focusing operation; and
    a third lens group having a positive refractive power and comprising a positive lens and a negative lens,
    wherein the first lens group, the second lens group, and the third lens group are sequentially arranged in a direction from an object side to an image side, and
    wherein the first lens group further comprises an aperture stop and a lens closest to an object side of the aperture stop is configured to perform a handshaking compensation operation.

16. The single focus lens of claim 15, wherein the lens configured to perform handshaking compensation comprises a biconcave lens.

17. A photographing apparatus comprising a single focus lens and an image sensor configured to receive an image formed by the single focus lens,
    wherein the single focus lens comprises: a first lens group having a positive refractive power, the first lens group comprising a first negative lens and a second negative lens arranged in succession, without another intervening lens, at a most object side of the first lens group; a second lens group having a negative refractive power and comprising a focusing lens configured to perform a focusing operation; and a third lens group having a positive refractive power and comprising a positive lens and a negative lens, wherein the first lens group, the second lens group, and the third lens group are sequentially arranged in a direction from an object side to an image side, and wherein the first negative lens is a meniscus lens having a convex object side and the second negative lens is a meniscus lens having a convex object side and wherein the first lens group further comprises an aperture stop.

\* \* \* \* \*